United States Patent
Hamaoka et al.

(10) Patent No.: US 7,102,306 B2
(45) Date of Patent: Sep. 5, 2006

(54) BRUSHLESS DC MOTOR DRIVING METHOD AND APPARATUS FOR IT

(75) Inventors: Koji Hamaoka, Osaka (JP); Hidehisa Tanaka, Shiga (JP); Tomonori Ouchiyama, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/546,001

(22) PCT Filed: Mar. 8, 2004

(86) PCT No.: PCT/JP2004/002958

§ 371 (c)(1),
(2), (4) Date: Aug. 18, 2005

(87) PCT Pub. No.: WO2004/084400

PCT Pub. Date: Sep. 30, 2004

(65) Prior Publication Data
US 2006/0082339 A1     Apr. 20, 2006

(30) Foreign Application Priority Data

| Mar. 17, 2003 | (JP) | 2003-071421 |
| Sep. 19, 2003 | (JP) | 2003-327817 |
| Dec. 16, 2003 | (JP) | 2003-417810 |

(51) Int. Cl.
H02P 1/00 (2006.01)
(52) U.S. Cl. ...................... 318/254; 318/138; 318/439; 318/599
(58) Field of Classification Search ................ 318/254, 318/439, 138, 599
See application file for complete search history.

(56) References Cited

U.S. PATENT DOCUMENTS

| 5,457,374 A | * | 10/1995 | Branecky et al. ............ 318/801 |
| 6,002,226 A | * | 12/1999 | Collier-Hallman et al. . 318/439 |
| 6,400,107 B1 | * | 6/2002 | Nakatani et al. ............. 318/254 |
| 6,875,165 B1 | * | 4/2005 | Dejuan et al. ................. 600/3 |

FOREIGN PATENT DOCUMENTS

| JP | 07-087782 | | 3/1995 |
| JP | 09-088837 | | 3/1997 |
| JP | 09088837 | * | 3/1997 |
| JP | 09-285177 | | 10/1997 |
| JP | 09285177 | * | 10/1997 |
| JP | 11-341860 | | 12/1999 |
| JP | 11341860 | * | 12/1999 |
| JP | 2000-078880 | | 3/2000 |
| JP | 2001-037281 | | 2/2001 |
| JP | 2002-125387 | | 4/2002 |
| JP | 2002-330599 | | 11/2002 |

* cited by examiner

OTHER PUBLICATIONS

International Search Report for PCT/JP2004/002958, dated Jun. 29, 2004.

Primary Examiner—Rita Leykin
(74) Attorney, Agent, or Firm—RatnerPrestia

(57) ABSTRACT

A rectangular wave or a waveform similar to the rectangular wave is output with an conductive angle no less than 120° but no more than 150° during low-speed operation, but output a rectangular wave, a sine wave or a waveform similar to them with an conductive angle no less than 130° but under 180° by changing the frequency only while maintaining the PWM duty constant at high-speed operation, making it possible to realize high-efficiency and low-noise operation at low-speed operation, secure stable high speed, and prevent peak current of effective current because the current waveform also comes closer to sine wave.

28 Claims, 18 Drawing Sheets

US 7,102,306 B2

BRUSHLESS DC MOTOR DRIVING METHOD AND APPARATUS FOR IT

This application is a U.S. National phase application of PCT International application PCT/JP2004/002958.

TECHNICAL FIELD

This invention concerns a brushless DC motor driving method and an apparatus for it, more specifically a driving method of brushless DC motor most suited for driving the compressor of refrigerators and air conditioners, etc. and an apparatus for it.

BACKGROUND ART

The mainstream of refrigerators produced in recent years is constituted by large models with a capacity of 350 liters or over, and the majority of those refrigerators are represented by inverter-controlled refrigerators with highly efficient variable compressor speed. Many of compressors for those refrigerators adopt brushless DC motor having a rotor with permanent magnet, for the purpose of achieving higher efficiency. Moreover, since the brushless DC motor is installed under environments of high temperature, high pressure, refrigerant ambiance, and oil ambiance in the compressor, there is no way to use any Hall element. For that reason, a method of detecting the rotor position from the voltage induced on the stator is often used.

FIG. 21 is a block diagram of a conventional brushless DC motor drive unit, disclosed on Japanese Laid-Open Patent Application No. H9-88837. In the diagram, the commercial power source 101 is an AC power supply unit with a frequency of 50 Hz or 60 Hz and a voltage of 100V in Japan. The rectifier circuit 102 is composed of bridge-connected rectifying diodes 102a to 102d and smoothing electrolytic capacitors 102e, 102f. The circuit in the diagram, which is a voltage doubler rectifier circuit, provides a DC voltage of 280V from AC 100V input. The inverter circuit 103 is constructed with 6 switching elements 103a, 103b, 103c, 103d, 103e, 103f formed in three-phase bridge. The respective switching elements have parallel diodes in reverse direction for reflux current, but they are omitted in this diagram. The brushless DC motor 104 is composed of a rotor 104a having a permanent magnet and a stator 104b having a three-phase winding. The rotor 104a can be rotated as a three-phase AC current produced by the inverter 103 flows through the three-phase winding of the stator 104b. The rotating motion of the rotor 104a is changed into alternating motion by a crankshaft (not illustrated), to drive the compressor for compressing refrigerant.

The back electromotive voltage detecting circuit 105 detects rotor position, from the voltage induced on the stator 104b with rotations of the rotor 104a. The commuting circuit 106 makes logical signal conversion to the output signal of the back electromotive voltage detecting circuit 105, to produce a signal for driving the switching elements of the inverter 103.

The synchronous driving circuit 107 produces at prescribed frequency a signal of the same shape as the signal generated in the commuting circuit 106, to synchronously driving the brushless DC motor 104. The load state judging circuit 108 judges the load state in which the brushless DC motor 104 is being operated. The switching circuit 109 selects, with the output of the load state judging circuit 108, either the commuting circuit 106 or the synchronous driving circuit 107, to drive the brushless DC motor 104. The drive circuit 110 drives the switching elements of the inverter 103, with a signal from the switching circuit 109.

In the case where the load detected by the load state judging circuit 108 is an ordinary load, the driving is made with the commuting circuit 106. In that case, the back electromotive voltage detecting circuit 105 detects the rotor position, and the commuting circuit 106 produces commuting pattern for driving the inverter 103 based on the rotor position. This commuting pattern is supplied through the switching circuit 109 to the drive circuit 110, to drive the switching elements of the inverter 103. As a result, the brushless DC motor 104 is driven in correspondence to the rotor position. Namely, the brushless DC motor 104 is driven as an ordinary brushless DC motor.

As the load increases, the brushless DC motor 104 reduces in rotating speed because of its characteristics. This state is judged by the load state judging circuit 108 as a high-load state, and the output of the switching circuit 109 is switched to the signal from the synchronous driving circuit 107. Namely, the brushless DC motor 104 is driven as a synchronous motor, to prevent reduction of rotating speed at high load.

DISCLOSURE OF THE INVENTION

The objective of the present invention is to provide a brushless DC motor drive unit, capable of high-speed rotation with improved motor efficiency at low speed.

The brushless DC motor drive unit according to the present invention comprises:

a brushless DC motor having a stator and a rotor including a permanent magnet, an inverter for supplying electric power to the brushless DC motor, a drive unit for driving the inverter, a position detecting unit for outputting rotor position signal based on the voltage induced on the stator of the brushless DC motor, a first waveform generating unit for outputting drive signal based on the rotor position signal, while performing duty control of PWM, a second waveform generating unit for outputting drive signal driving the brushless DC motor as a synchronous motor, while keeping the PWM duty constant, and a commutation judging unit for driving the inverter through the drive unit with drive signal output by the first waveform generating unit during low-speed rotation of the brushless DC motor, but driving the inverter through the drive unit with drive signal output by the second waveform generating unit during high-speed rotation of the brushless DC motor.

This makes it possible to realize low-noise operation with high efficiency during low-speed rotation, secure stable high-speed operation during high-speed rotation, and control peak current of effective current because the current waveform also comes closer to sine wave.

DETAILED DESCRIPTION OF THE PREFERRED EMBODIMENTS

Preferred embodiments of the refrigerator by the present invention will be explained below, with reference to drawings.

FIRST EMBODIMENT

Figure 21:
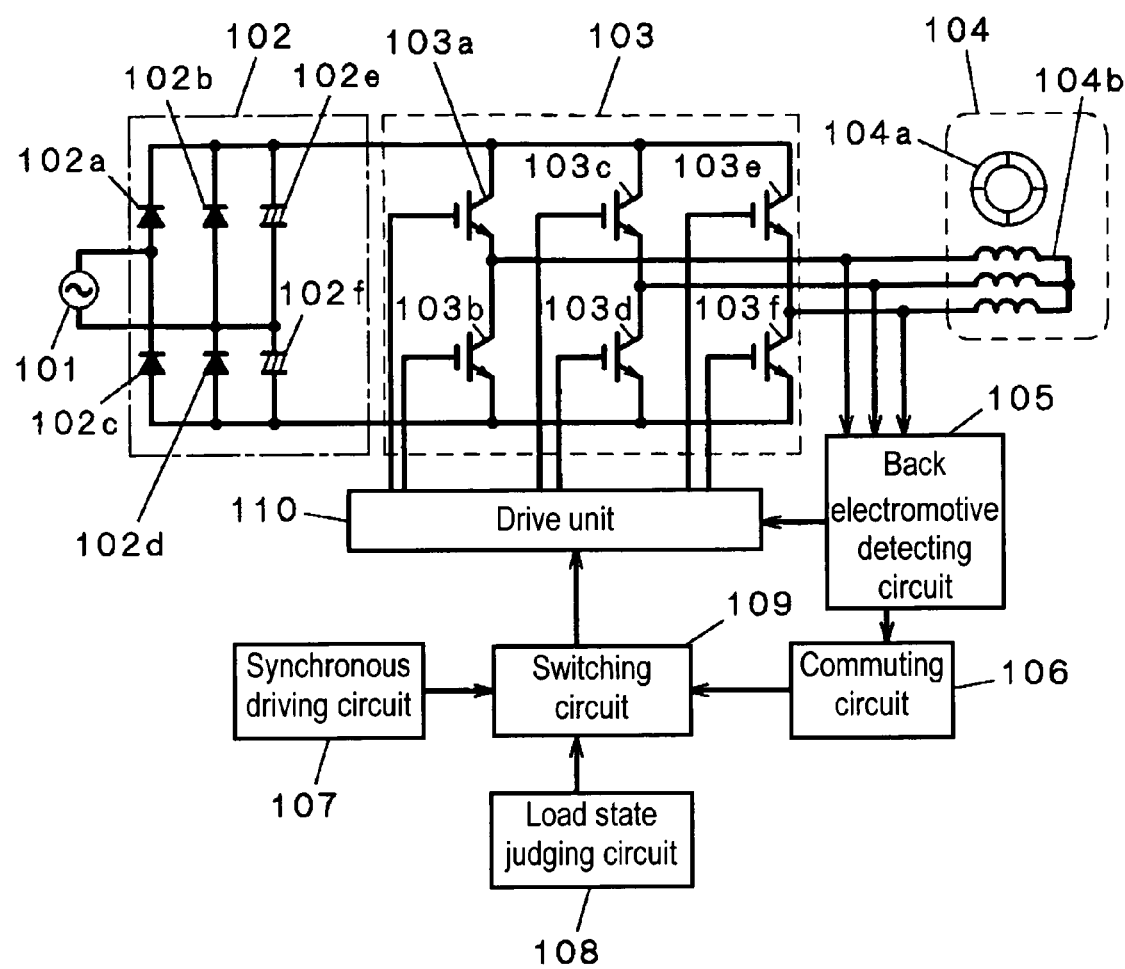
FIG. 21 is a block diagram of a conventional brushless DC motor drive unit.

FIG. 21 is a block diagram of a brushless DC motor drive unit in the first embodiment of the present invention.

In the diagram, the commercial power source 1 is an AC power supply unit with a frequency of 50 Hz or 60 Hz and a voltage of 100V in Japan. The rectifier circuit 2 is composed of bridge-connected rectifying diodes 2a to 2d and smoothing electrolytic capacitors 2e, 2f. The circuit in the diagram, which is a voltage doubler rectifier circuit, provides a DC voltage of 280V from AC 100V input of the commercial power source 1. The rectifier circuit 2 may be other rectifier circuit such as chopper circuit with full-wave rectification or variable DC voltage, circuit switchable for voltage doubler rectification or full-wave rectification, etc.

The inverter circuit 3 is constructed with 6 switching elements 3a, 3b, 3c, 3d, 3e, 3f formed in three-phase bridge. The respective switching elements have parallel diodes in reverse direction for reflux current, but they are omitted in this diagram.

The brushless DC motor 4 is composed of a rotor 4a having a permanent magnet and a stator 4b having a three-phase winding. The rotor 4a can be rotated as a three-phase AC current with PWM (pulse width modulation) waveform produced by the inverter 3 flows through the three-phase winding of the stator 4b. The rotating motion of the rotor 4a is changed into alternating motion by a crankshaft (not illustrated), to drive the compressor for compressing refrigerant.

The position detecting unit 5 detects rotor position, from the voltage induced on the stator 4b as the rotor 4a rotates.

The first waveform generating unit 6 produces a signal for driving the switching elements 3a, 3b, 3c, 3d, 3e, 3f of the inverter 3, based on the position detecting signal based on the position detecting unit 5. This drive signal produces rectangular waves with an conductive angle no less than 120° but no more than 150°. Trapezoidal wave or sine wave may also be used instead of rectangular wave.

The first waveform generating unit 6 further performs PWM duty control of drive signals for keeping the rotating speed constant. This enables efficient operation by operating with optimal duty, according to the rotating position.

The rotating speed detecting unit 7 detects the rotating speed of the brushless DC motor 4, by either counting at fixed time or cyclic measurement, etc. of the output signal of the position detecting unit 5.

The frequency setting unit 8 changes the output frequency while maintaining the PWM duty constant. The frequency limiting unit 9 limits the frequency from the frequency setting unit 8 so that it may not exceed the upper limit frequency.

The second waveform generating unit 10 produces a signal for driving the switching elements 3a, 3b, 3c, 3d, 3e, 3f of the inverter 3, based on the output signal based of the frequency setting unit 8. This driving signal produces rectangular waves with an conductive angle no less than 130° but under 180°. They may also be trapezoidal waves or sign waves instead of rectangular waves. The PWM duty of the driving signal is maintained constant at the maximum value.

The commutation judging unit 11 selects to drive the inverter 3 either with the first waveform generating unit 6 or with the second waveform generating unit 10, based on the rotating speed detected by the rotating speed detecting unit 7. It selects the first waveform generating unit 6 in the case of low rotating speed, but the second waveform generating unit 10 in the case of high rotating speed.

The judgement of low rotating speed or high rotating speed may be made from the setting of the rotating speed or the PWM duty.

The drive unit 12 drives the switching elements of the inverter 3, with the output signal from the switching circuit 11. An optimal AC output is applied from the inverter 3 to the brushless DC motor 4, to rotate the rotor 4a.

The upper limit frequency setting unit 13 sets upper limit frequency based on the maximum rotating speed (at 100% duty) in the case of driving by the first waveform generating unit 6. In this embodiment, the upper limit frequency is set for 1.5 times the maximum rotating speed. For example, if the maximum rotating speed is 50 r/s, the upper limit frequency is set for 75 r/s. The frequency limiting unit 9 utilizes the set upper limit frequency for the limitation of frequency.

During driving by the second waveform generating unit 10, the brushless DC motor 4 is operated as a synchronous motor. If the driving frequency is too high, the motor gets out of synchronization to lose synchronism. Therefore, the upper limit frequency is set lower than the frequency causing loss of synchronism.

The upper limit frequency changing unit 14 forcibly switches the commutation judging unit 11 to the first waveform generating unit 6, and resets the upper limit frequency by the upper limit frequency setting unit 13, in the case where driving by the second waveform generating unit 10 continued for a prescribed time (30 minutes, for example). Details on the resetting of upper limit frequency will be described later.

The voltage detecting unit 15 detects the output voltage (DC voltage) of the rectifier circuit 2. In response to the output of this voltage detecting unit 15, the upper limit frequency correcting unit 16 corrects the upper limit frequency. Usually, it raises the upper limit frequency if the voltage is higher than the standard, and lowers the upper limit frequency if the voltage is lower than the standard. Those functions are realized with a program of the microcomputer 17.

Next, the motions of the apparatus will be explained with reference to FIG. 1 to FIG. 6.

Firstly, the motions during low-speed driving will be explained. The brushless DC motor 4 is driven as shown in FIG. 2 with signals from the first waveform generating unit 6, in the case of low rotating speed.

Figure 1:
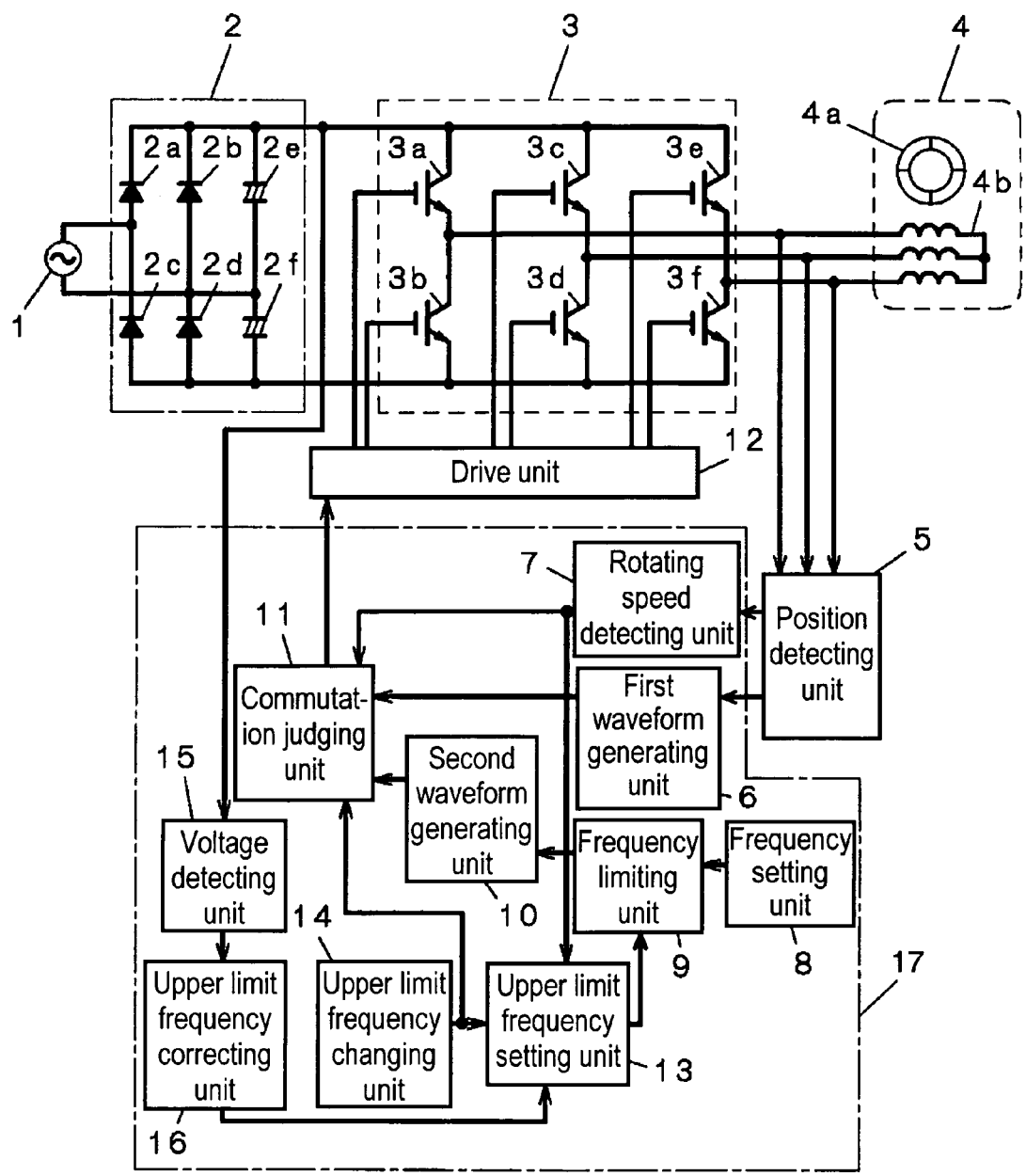
FIG. 1 is a block diagram of the brushless DC motor drive unit of the first preferred embodiment of the present invention.
Figure 2:
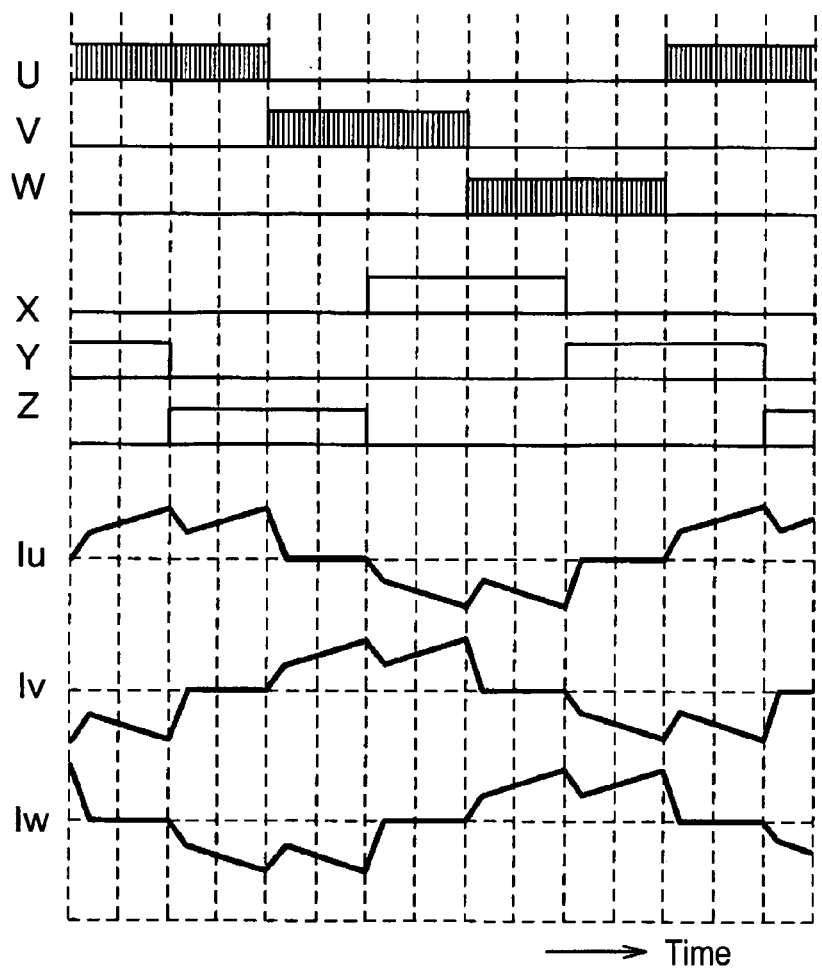
FIG. 2 is a timing chart of inverter driving at low-speed rotation in the first preferred embodiment of the present invention.

In FIG. 2, U, V, W, X, Y, Z represent the drive signal of the switching elements 3a, 3b, 3c, 3d, 3e, 3f respectively, while Iu, Iv, Iw show the current of U, V, W phases respectively.

According to the signals of the position detecting unit 5, commutation is made one after another at an conductive angle of 120°. Moreover, the drive signals U, V, W of the upper arm are performing duty control by PWM. The waveform of current is saw-tooth waveform as shown in the drawing. In this case, the brushless DC motor 4 is driven most efficiently, because commutation is made at optimal timing with the output of the position detecting unit 5.

Figure 3:
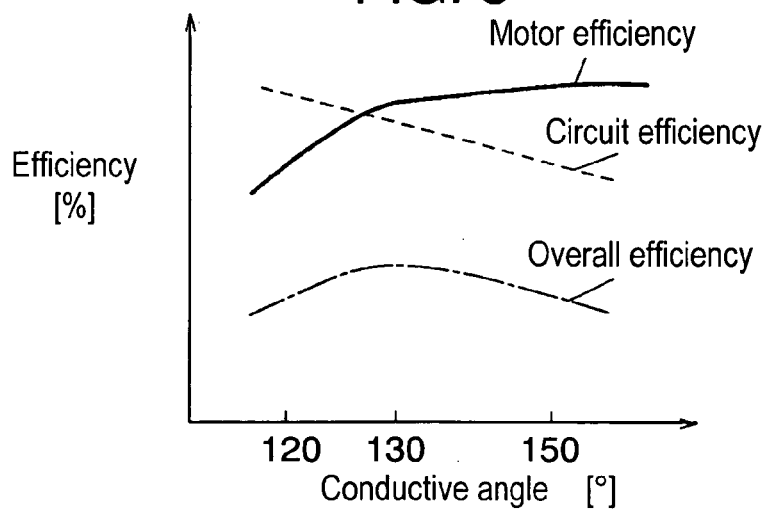
FIG. 3 is an conductive angle=efficiency characteristic chart at low-speed rotation in the first preferred embodiment of the present invention.

FIG. 3 indicates efficiency during low-speed driving. As shown in the chart, the motor efficiency improves at an conductive angle larger than 120°. This is because the motor current decreases and the copper loss of the motor decreases, as the conductive angle expands. However, the circuit efficiency drops, because the number of times of switching increases and the switching loss increases. As a result, the overall efficiency becomes higher at an conductive angle larger than 130°. Therefore, the conductive angle shall preferably be no less than 120° but no more than 150°.

Figure 4:
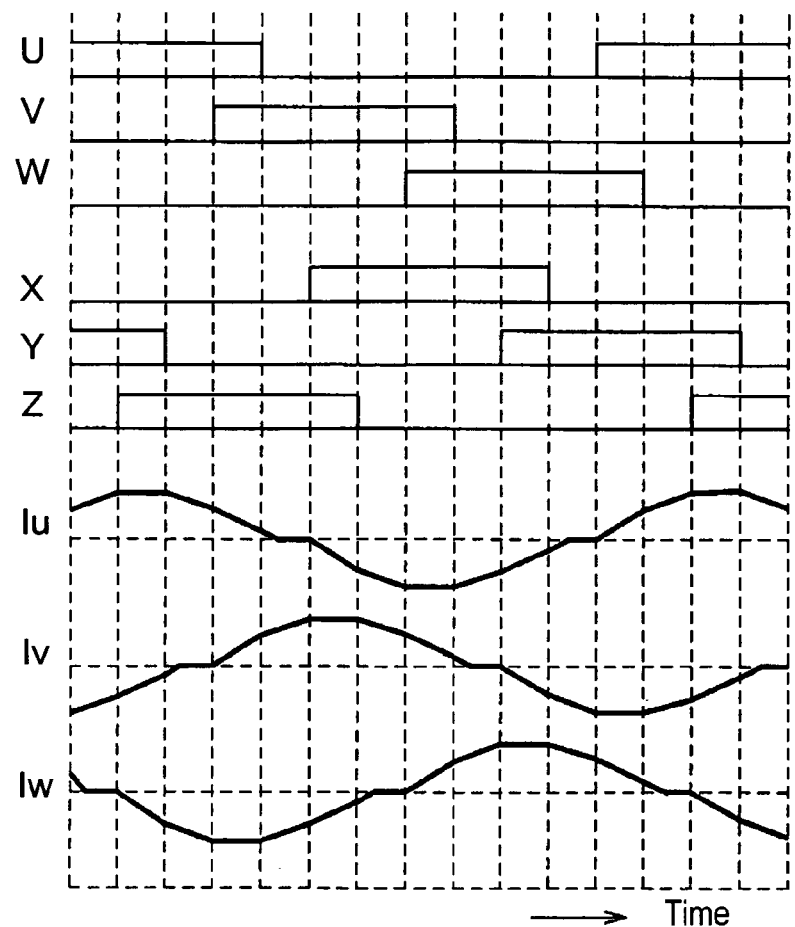
FIG. 4 is a timing chart of inverter driving at high-speed rotation in the first preferred embodiment of the present invention.

Next, explanation will be made on the motions during high-speed driving. The brushless DC motor 4 is driven as shown in FIG. 4 with signals from the second waveform generating unit 10, in the case of high rotating speed. The numerals in FIG. 4 are the same as those in FIG. 2. The respective drive signals perform commutation at prescribed frequency, according to the output of the frequency setting unit 8. The conductive angle shall preferably be no less than 130° but no more than 180°. Although the conductive angle is 150° in FIG. 4, the waveform of current comes closer to sine wave as the conductive angle is widened. During high-speed driving, the brushless DC motor 4 is driven as a synchronous motor, and the current increases as the frequency increases. However, even a higher current may be let flow without triggering overcurrent protection, because the current waveform comes close to sine wave and improved to a waveform with small peak current, by keeping the conductive angle at no less than 130° but no more than 180°.

Figure 5:
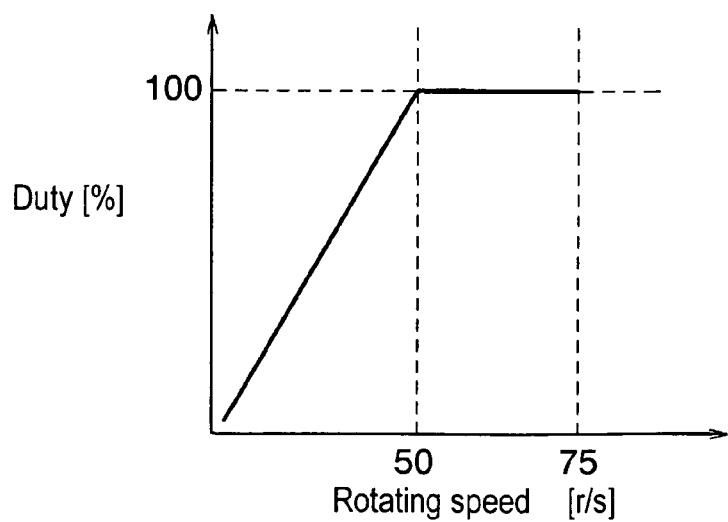
FIG. 5 is a rotating speed=duty characteristic chart in the first preferred embodiment of the present invention.

Next, explanation will be given on the switching between the first waveform generating unit 6 and the second waveform generating unit 10. FIG. 5 shows rotations=duty characteristics of the brushless DC motor in this embodiment. In FIG. 5, low-speed driving is made by the first waveform generating unit 6 at a rotating speed no higher than 50 r/s. The PWM duty is automatically adjusted to a value of best efficiency in correspondence to the rotating speed, by means of feedback control. At 50 r/s, the driving by the first waveform generating unit 6 reaches the limit beyond which no increase of rotations can be made. Therefore, the driving is switched to driving by the second waveform generating unit 10. In this state, the upper limit frequency setting unit 13 sets upper limit frequency for 75 r/s (1.5 times 50 r/s). In the case where the output signal from the frequency setting unit 8 exceeds 75 r/s, the frequency limiting unit 9 prohibits any further outputting of frequency. At a rotating speed between 50 r/s and 75 r/s, the rotating speed of the brushless DC motor 4 is increased, by increasing the output frequency of the frequency setting unit 8, while keeping the PWM duty at 100%.

Figure 6:
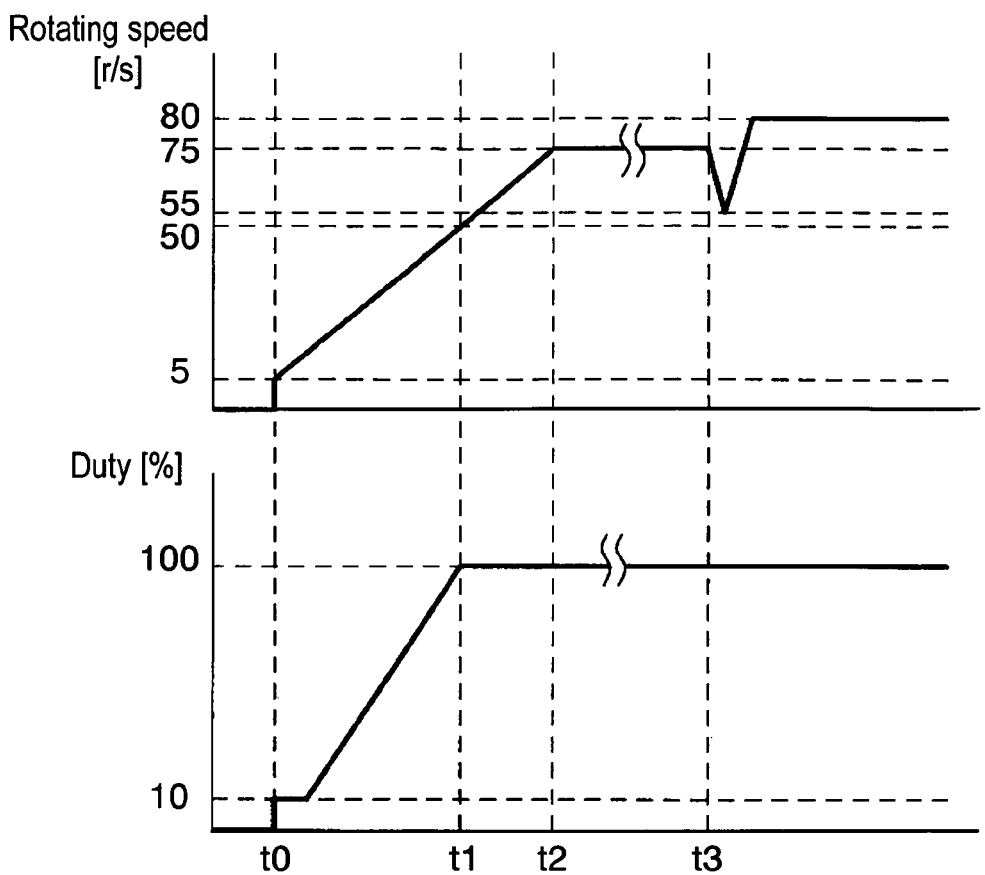
FIG. 6 is a timing chart of rotating speed and duty in the first preferred embodiment of the present invention.

Next, explanation will be made on the motions of the upper limit frequency changing unit 14. In the case where this apparatus is used for the compressor of a refrigerator, etc., the load state varies in the course of a comparatively long time, making it necessary to change the upper limit frequency accordingly. FIG. 6 explains a change of upper limit frequency.

At time t0, the brushless DC motor 4 is driven by the first waveform generating unit 6 at a rotating speed command of 80 r/s to start working, and gradually increases its rotating speed. At the same time, the PWM duty also continues increasing.

At time t1, the rotating speed reaches 50 r/s and the PWM duty 100%, and the rotating speed can no longer be increased with driving by the first waveform generating unit 6. Therefore, the driving is switched to driving by the second waveform generating unit 10. In this state, the upper limit frequency setting unit 13 sets upper limit frequency for 75 r/s (1.5 times 50 r/s). After that, the rotating speed of the brushless DC motor 4 is increased, by increasing the output frequency of the frequency setting unit 8, while keeping the PWM duty at 100%.

At time t2, the rotating speed reaches its upper limit 75 r/s, and the operation continues at 75 r/s thereafter, in spite of the command given for 80 r/s.

At time t3 (30 minutes after time t2), the upper limit frequency changing unit 14 switches the driving to driving by the first waveform generating unit 6. And the rotating speed reduces to the maximum rotating speed enabling driving by the first waveform generating unit 6 (55 r/s). Because the load state at time t3 is lighter, compared with the load state at time t2, the maximum rotating speed is set for 55 r/s which is higher than that of 50 r/s at time t2. As a result, the upper limit frequency setting unit 13 resets the maximum rotating speed for 82.5 r/s (1.5 times 55 r/s).

After that, the rotating speed is increased by switching the driving to driving by the second waveform generating unit 10. Because the upper limit frequency is 82.5 r/s, this enables an operation at 80 r/s which is the initial rotating speed command. In this way, it becomes possible to realize optimal operation suitable to the load state, by correcting the upper limit frequency with repeated detection of load state at regular intervals, against load fluctuations.

Next, explanation will be made on the case where the voltage fluctuated at the commercial power source 1. In that case, the DC voltage output of the rectifier circuit 2 also varies at the same time. This change of DC voltage output is detected by the voltage detecting unit 15. Based on the result of this detection, the upper limit frequency correcting unit 16 determines the value to be corrected, and corrects the upper limit frequency set by the upper limit frequency setting unit 13. The maximum rotating speed of a brushless DC motor varies in proportion to the DC voltage output of the rectifier circuit 2. Therefore, by making a correction of lowering the upper limit frequency by 10% if the DC voltage dropped by 10% and raising the upper limit frequency by 10% if the DC voltage increased by 10%, it becomes possible to provide a brushless DC motor drive unit which continues rotating without loss of synchronism even with fluctuations of the input voltage.

Figure 7:
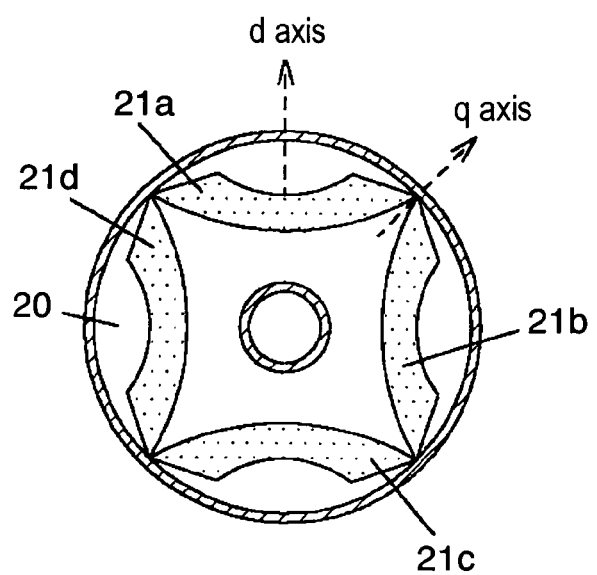
FIG. 7 is a structural drawing of the rotor of the brushless DC motor in the first preferred embodiment of the present invention.

Next, explanation will be made on the structure of the brushless DC motor 4. FIG. 7 is a structural drawing of the rotor of the brushless DC motor. The rotor core 20 is realized by placing one upon another punched thin silicon steel sheets with a thickness of 0.35 mm to 0.5 mm. Reference numerals 21a, 21b, 21c, 21d are magnets, embedded in the rotor 20 in the shape of a reverse circular arc. The magnets may be of flat shape. Ferrite magnet and rare earth magnet are commonly used. In a rotor of such construction, the respective reluctances in axial direction of the axis d at the center of the magnet and of the axis q at the edge of the magnet are different from each other. Therefore, reluctance torque can be utilized, in addition to the torque due to magnetic flux (magnet torque) of the magnet. As a result, a high-efficiency motor can be realized. Moreover, in driving by the second waveform generating unit 10, a large reluctance torque can be expected because the motor operates with an electric current in advancing phase.

SECOND EMBODIMENT

Figure 8:
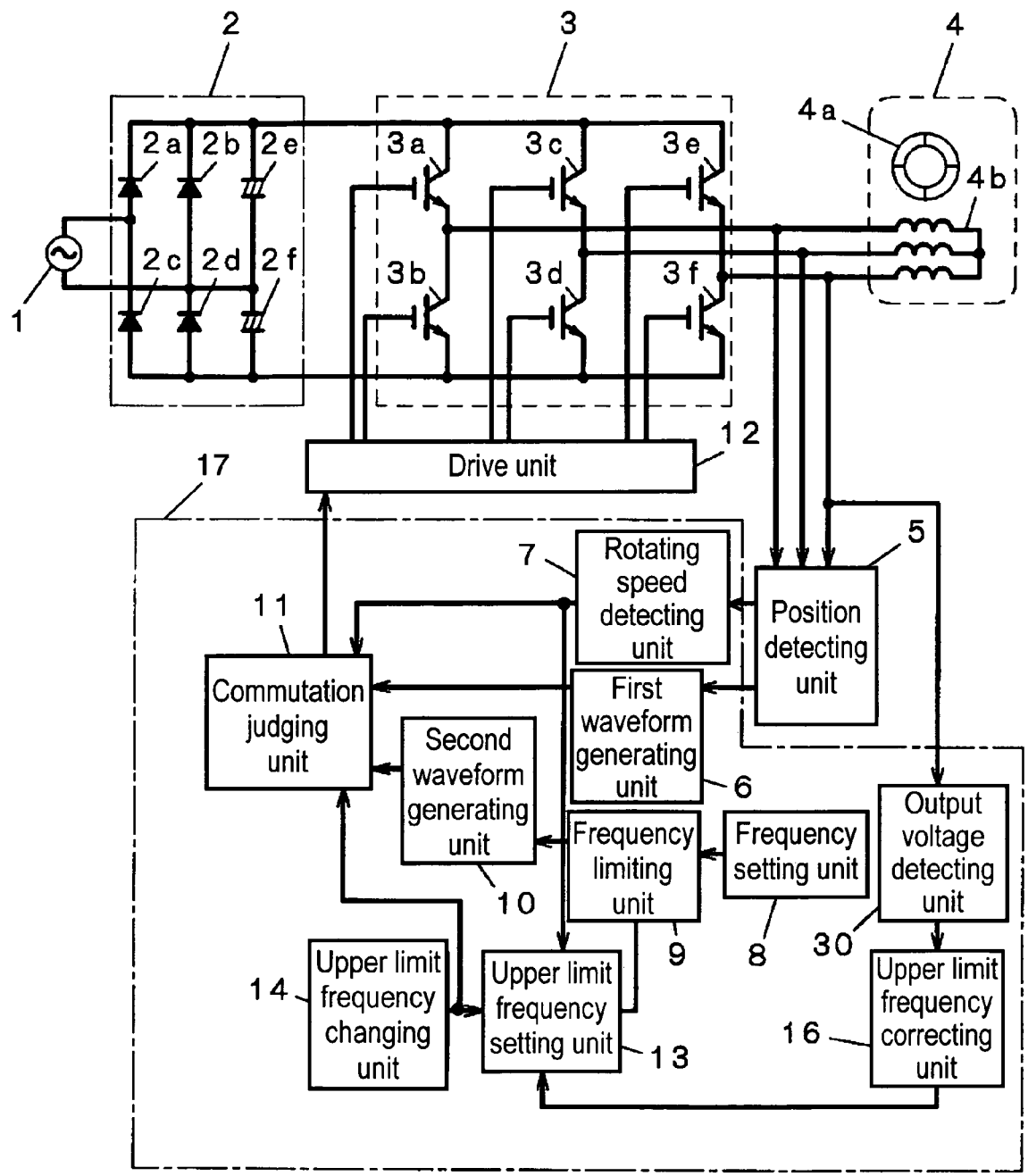
FIG. 8 is a block diagram of the brushless DC motor drive unit of the second preferred embodiment of the present invention.

FIG. 8 is a block diagram of the brushless DC motor drive unit of the second embodiment of the present invention. In FIG. 8, the portions which were already explained in the preceding embodiment are furnished with the same reference numerals, and any detailed explanation on them will be omitted.

The output voltage detecting unit 30 detects the output voltage of the rectifier circuit 2 through the W-phase terminal of the stator winding, when the switching element 3e of the inverter 3 is turned ON. The upper limit frequency correcting unit 16 sends out an output for correcting the upper limit frequency of the upper limit frequency setting unit 13, in response to the output from the output voltage detecting unit 30. The upper limit frequency is corrected upward if the voltage is higher than the standard, but is corrected downward if the voltage is lower than the standard. This makes it possible to maintain a stable high-speed rotation even in case of fluctuations of the supply voltage.

THIRD EMBODIMENT

Figure 9:
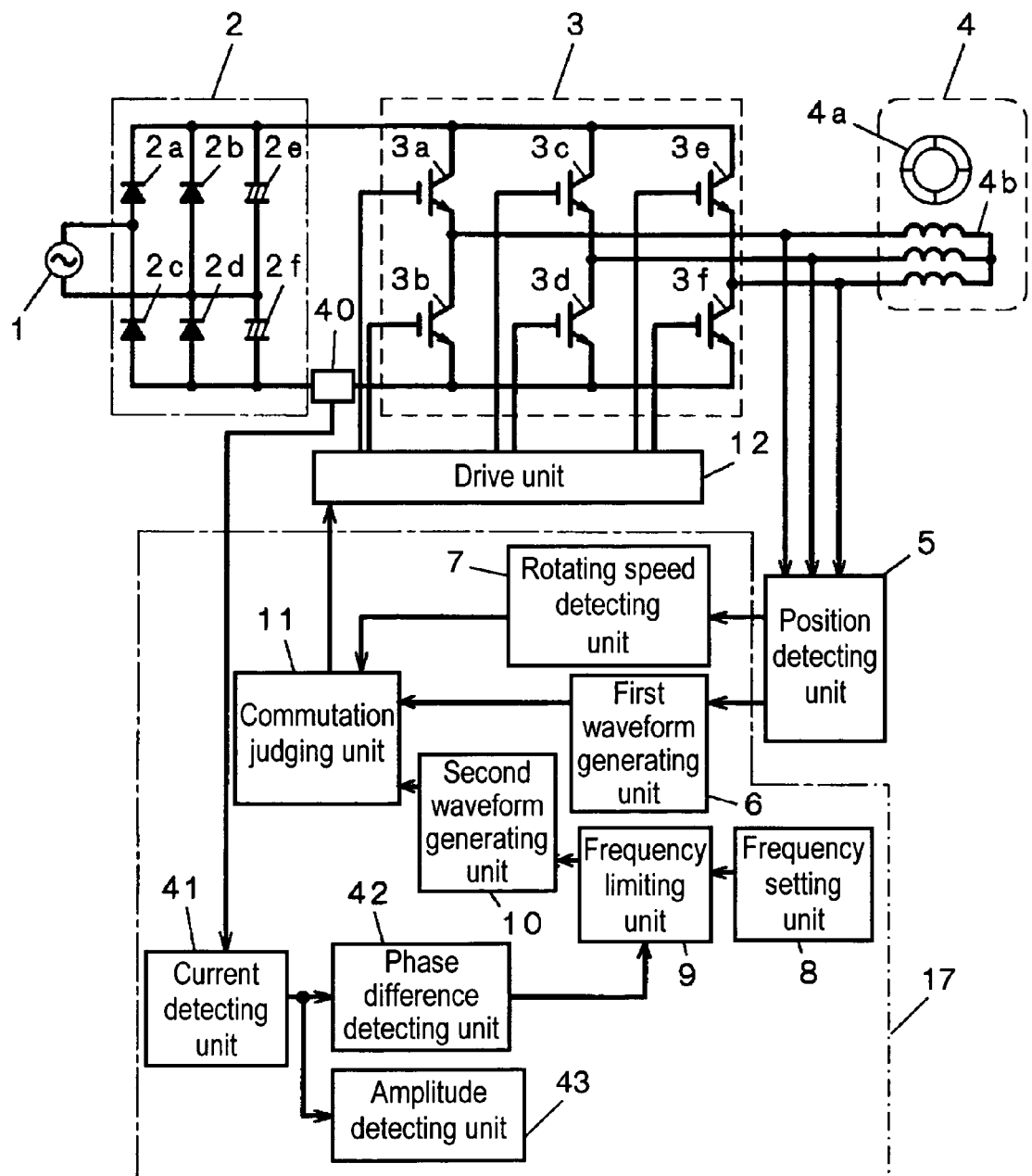
FIG. 9 is a block diagram of the brushless DC motor drive unit in the third preferred embodiment of the present invention.

FIG. 9 is a block diagram of the brushless DC motor drive unit of the third embodiment of the present invention. In FIG. 9, the portions which were already explained in the preceding embodiments are furnished with the same reference numerals, and any detailed explanation on them will be omitted.

A shunt resistor 40 is provided between the rectifier circuit 2 and the inverter 3. The current detecting unit 41 detects the current flowing through the shunt resistor 40. The phase difference detecting unit 42 detects the phase difference between the current and the output voltage detected by the current detecting unit 41. This phase difference is 5°~15°, in the case of low-speed operation when the brushless DC motor 4 is driven by the first waveform generating unit 6. However, this phase difference expands if the brushless DC motor 4 makes a high-speed operation with driving as a synchronous motor by the second waveform generating unit 10. At a phase difference over 60°, the motor may lose synchronism. The frequency limiting unit 9 limits the frequency against any further increase of the rotating speed to prevent loss of synchronism, in case the phase difference exceeded 55°.

The amplitude detecting unit 43 detects the amplitude of the current detected by the current detecting unit 41. The current value remains about constant, in the case where the brushless DC motor 4 maintains a constant torque with driving by the first waveform generating unit 6. However, in the case where the brushless DC motor 4 is driven as a synchronous motor by the second waveform generating unit 10, the current value continues increasing as the rotating speed increases. Because the motor stops with functioning of a protective circuit (not illustrated) in case the amplitude of the current exceeded a prescribed value, the increase of the rotating speed must be stopped before the protective circuit works. The frequency limiting unit 9 limits the frequency against any further increase of the rotating speed to prevent stop of motor, in case the amplitude of the current exceed a prescribed value.

FOURTH EMBODIMENT

Figure 10:
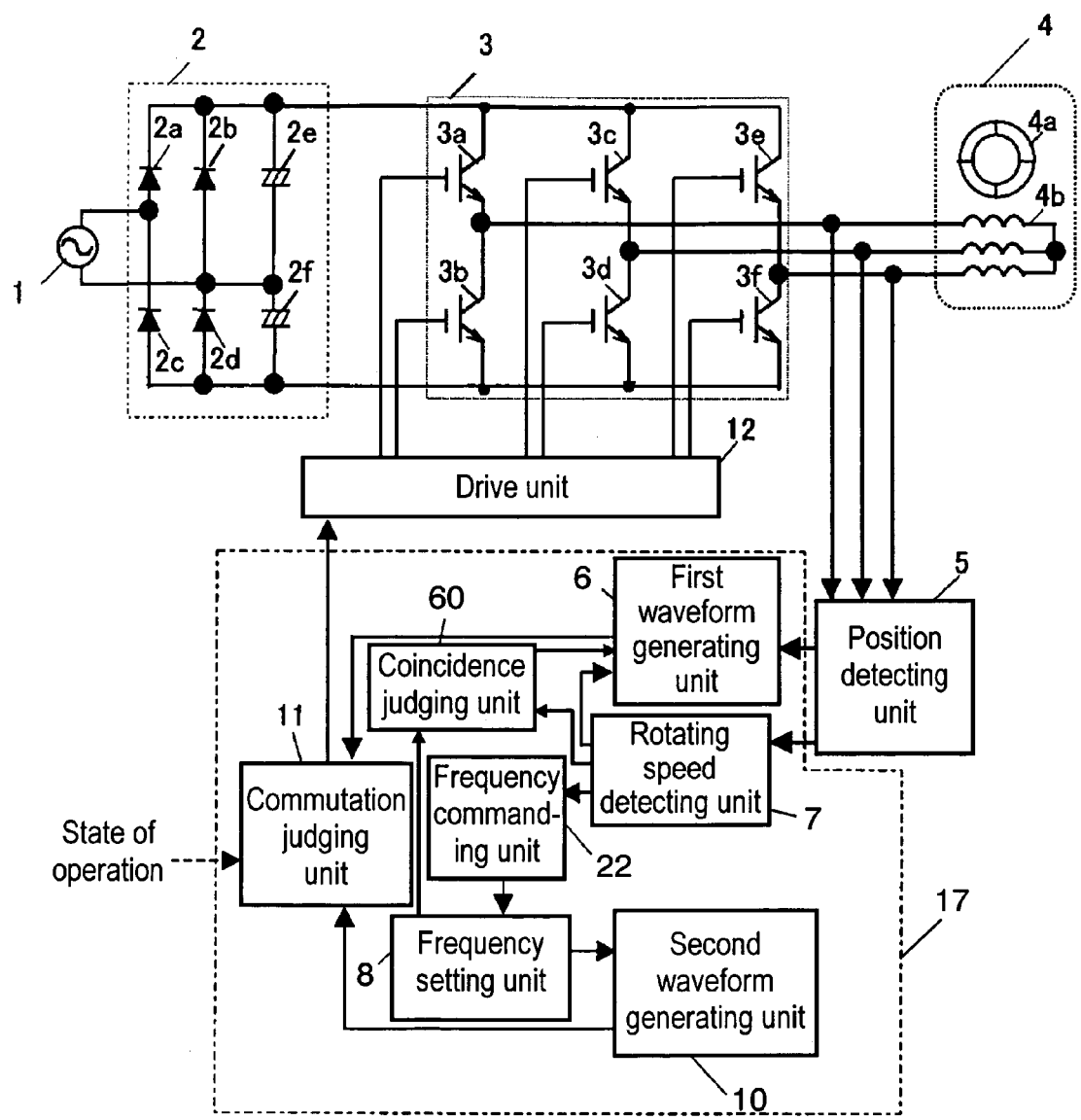
FIG. 10 is a block diagram of the brushless DC motor drive unit in the fourth preferred embodiment of the present invention.

FIG. 10 is a block diagram of the brushless DC motor drive unit in the fourth embodiment of the present invention. In FIG. 10, the portions which were already explained in the preceding embodiments are furnished with the same reference numerals, and any detailed explanation on them will be omitted.

This embodiment provides a brushless DC motor driving method and an apparatus for it, for controlling disturbance to motor current by putting the commutation timing and the rotating speed of the motor in coincidence with each other, when the commutation judging unit makes switching between motor driving by the first waveform generating unit and motor driving by the second waveform generating unit.

Figure 11:
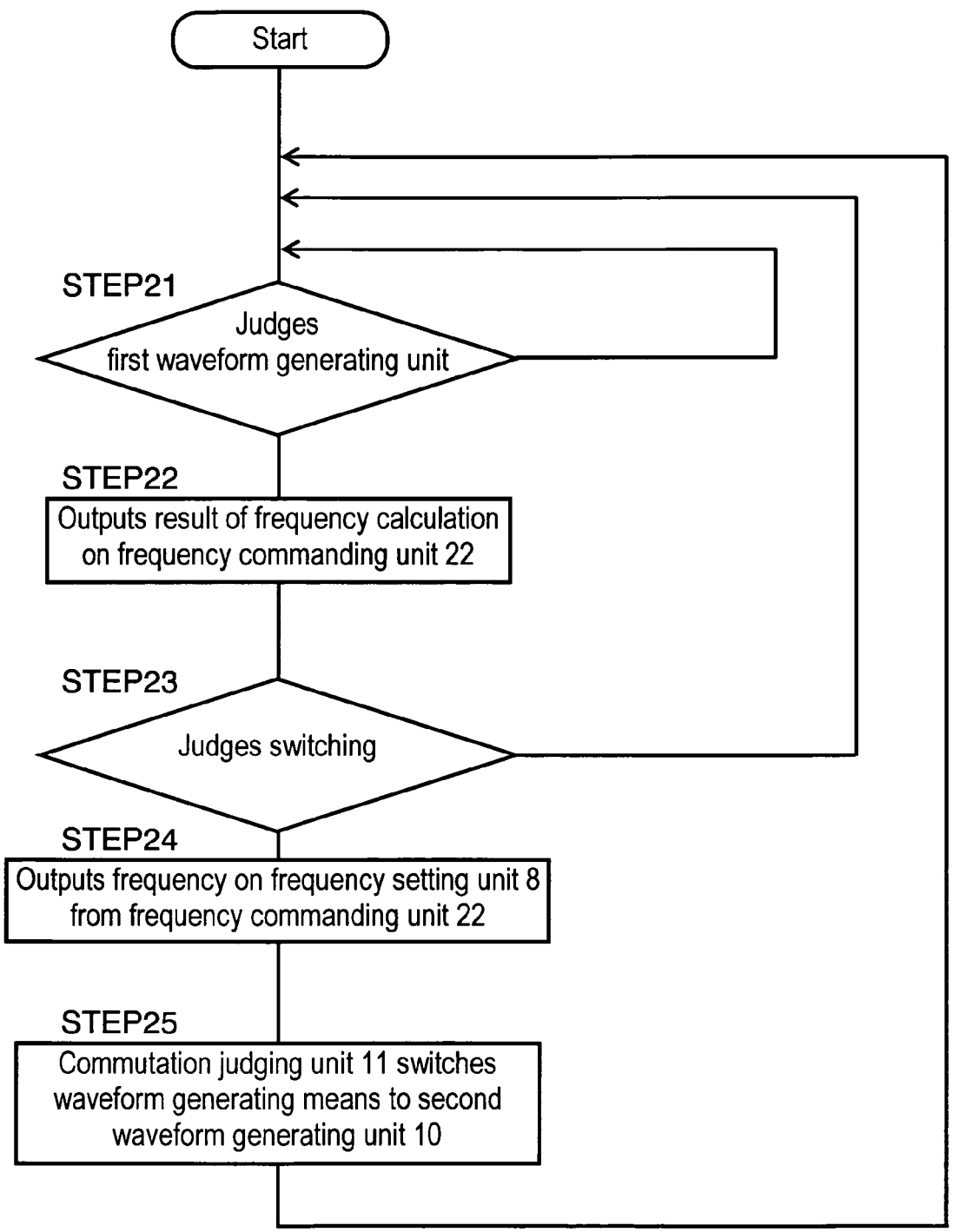
FIG. 11 is a flow chart showing the switching motion from first waveform generating unit to second waveform generating unit, in the fourth preferred embodiment of the present invention.

(1) In the first place, a case of switching from first waveform generating unit to second waveform generating unit will be explained, with reference to the block diagram in FIG. 10 and the flow chart in FIG. 11.

Firstly, in Step 21, the system judges if the first waveform generating unit 6 is selected by the commutation judging unit 11 or not. If the first waveform generating unit 6 is selected, the system proceeds to Step 22.

In Step 22, the system inputs the result of detection by the rotating speed detecting unit 7 in the frequency commanding unit 22, and proceeds to Step 23.

In Step 23, the commutation judging unit 11 judges if switching to the second waveform generating unit 8 is necessary or not, from such data as motor speed, PWM duty, etc. The system proceeds to Step 24 if switching is judged necessary.

In Step 24, the frequency commanding unit 22 inputs the result of detection input in Step 22, in the frequency setting unit 8.

Lastly, in Step 25, the commutation judging unit 11 switches the first waveform generating unit 6 to the second waveform generating unit 10.

As described above, by providing a frequency commanding unit 22, it becomes possible to equalize the timing of commutation and the operating frequency of the motor, before and after the switching from the first waveform generating unit 6 to the second waveform generating unit 10, thus enabling to control disturbance of the electric current at the time of switching.

Figure 12:
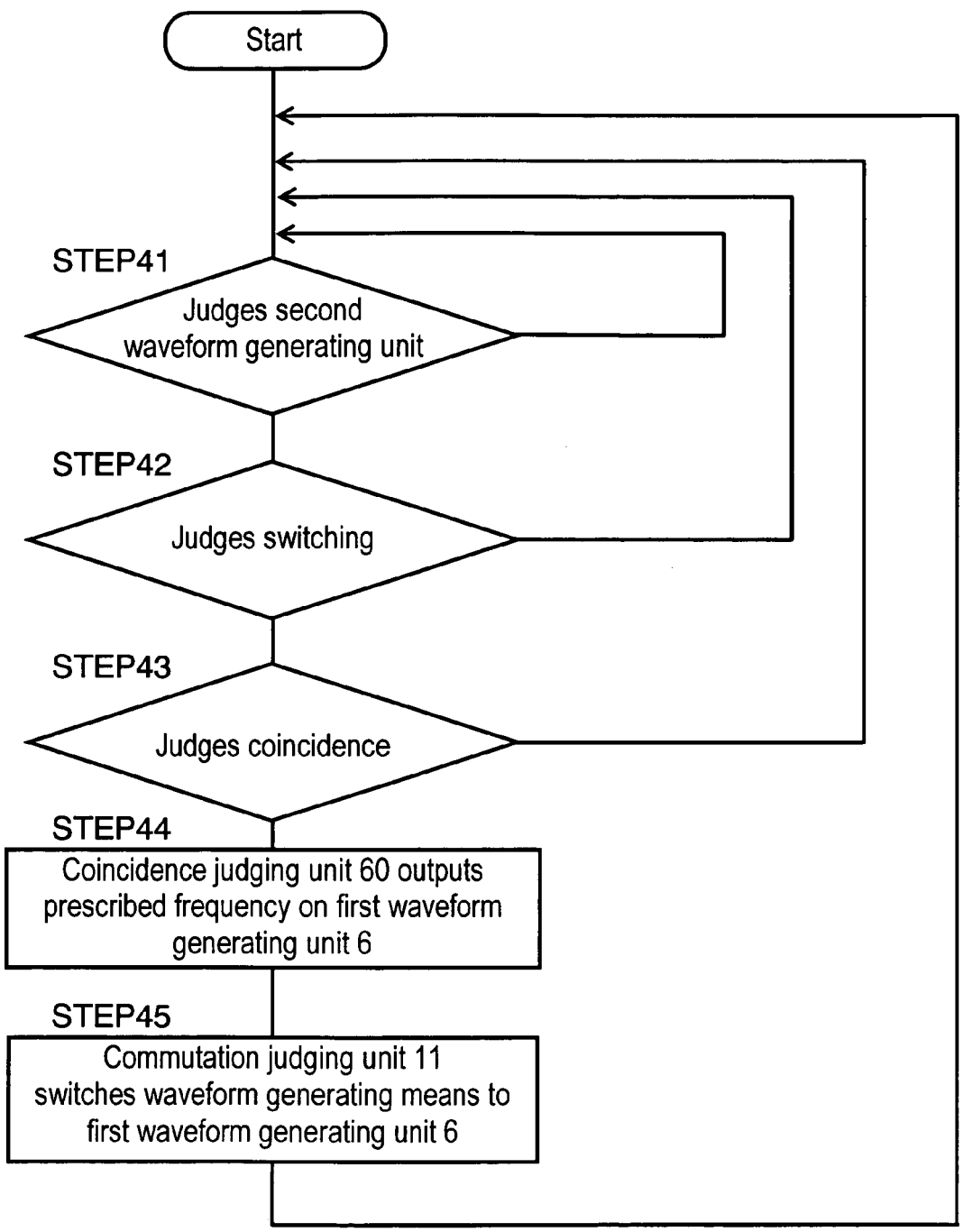
FIG. 12 is a flow chart showing the switching motion from second waveform generating unit to first waveform generating unit, in the fourth preferred embodiment of the present invention.

(2) Next, a case where switching is made from the second waveform generating unit to the first waveform generating unit will be explained, with reference to the block diagram in FIG. 10 and the flow chart in FIG. 12.

Firstly, in Step 41, judgement is made if the second waveform generating unit 10 is selected by the commutation judging unit 11 or not. If the second waveform generating unit 10 is selected, the system proceeds to Step 42.

In Step 42, the commutation judging unit 11 judges necessity or not of switching to the first waveform generating unit 6. If it is judged necessary to do so, the system proceeds to Step 43.

In Step 43, the coincidence judging unit 60 judges if the frequency detected by the rotating speed detecting unit 7 coincides with the frequency set by the frequency setting unit 8 or not. If coincidence is confirmed, the system proceeds to Step 44.

In Step 44, the coincidence judging unit 60 instructs the frequency setting unit 8 as output timing of waveform to the first waveform generating unit 6.

Lastly, in Step 45, the commutation judging unit 11 makes switching from the second waveform generating unit 10 to the first waveform generating unit 6.

As described above, by providing an coincidence judging unit 60, it becomes possible to equalize the timing of commutation and the operating frequency of the motor, before and after the switching from the second waveform generating unit 10 to the first waveform generating unit 6, thus enabling to control disturbance of the electric current at the time of switching.

FIFTH EMBODIMENT

Figure 13:
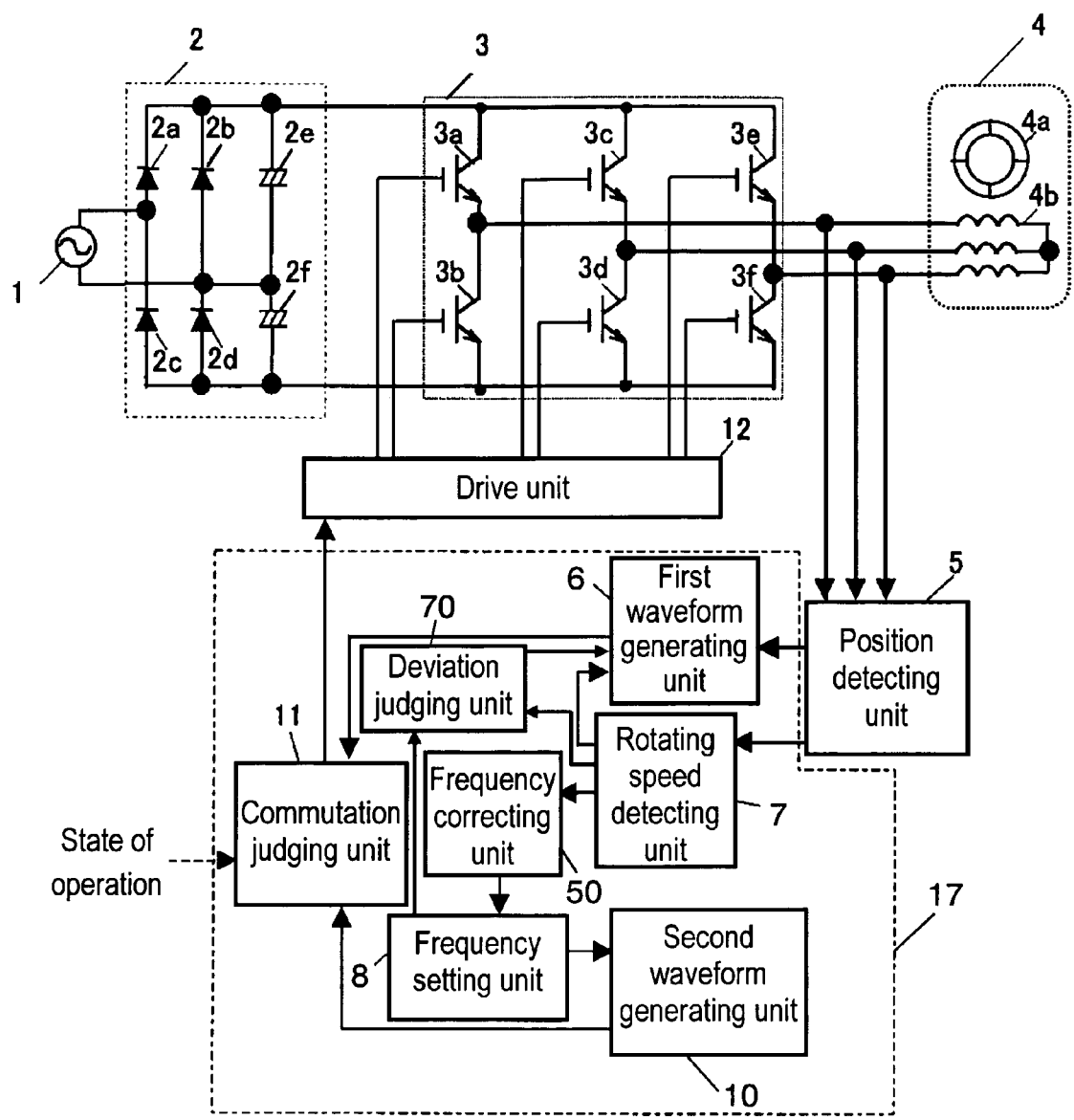
FIG. 13 is a block diagram of the brushless DC motor drive unit in the fifth preferred embodiment of the present invention.

FIG. 13 is a block diagram of the brushless DC motor drive unit in the fifth embodiment of the present invention. In FIG. 13, the portions which were already explained in the preceding embodiments are furnished with the same reference numerals, and any detailed explanation on them will be omitted.

This embodiment provides a brushless DC motor driving method and an apparatus for it, for controlling disturbance to motor current by producing a difference in the commutation timing and the rotating speed of the motor, when the commutation judging unit makes switching between motor driving by the first waveform generating unit and motor driving by the second waveform generating unit.

Figure 14:
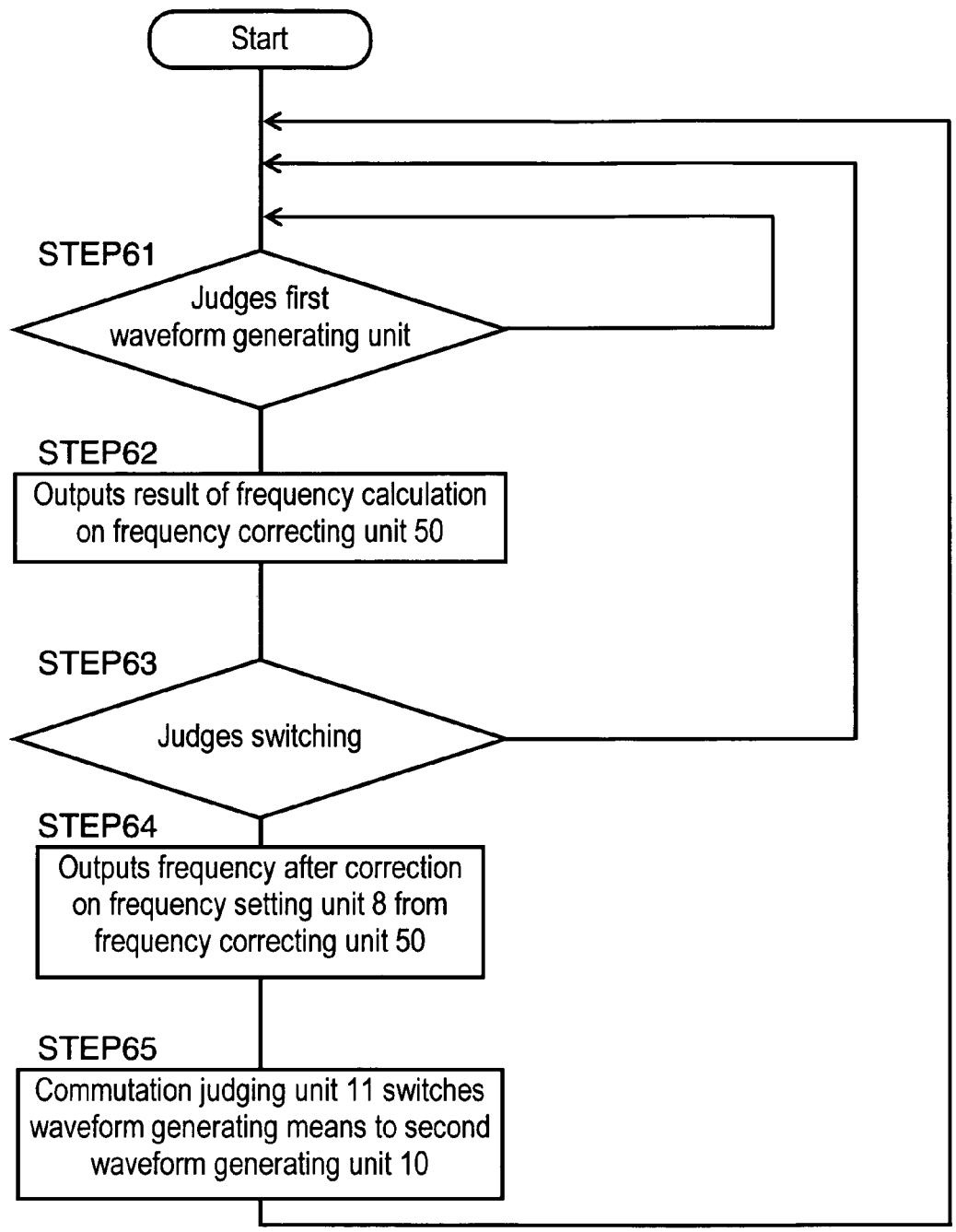
FIG. 14 is a flow chart showing the switching motion from first waveform generating unit to second waveform generating unit, in the fifth preferred embodiment of the present invention.

(1) In the first place, a case of switching from the first waveform generating unit to the second waveform generating unit will be explained, with reference to the block diagram in FIG. 13 and the flow chart in FIG. 14.

Firstly, in Step 61, the system judges if the first waveform generating unit 6 is selected by the commutation judging unit 11 or not. If the first waveform generating unit 6 is selected, proceeds to Step 62.

In Step 62, the system inputs the result of detection by the rotating speed detecting unit 7 in the frequency correcting unit 50, and proceeds to Step 63.

In Step 63, the commutation judging unit 11 judges if switching to the second waveform generating unit 8 is necessary or not, from such data as motor speed, PWM duty, etc. The system proceeds to Step 64 if switching is judged necessary.

In Step 64, the frequency correcting unit 50 corrects the result of detection by the rotating speed detecting unit 7 input in Step 62 to a proper value, and then inputs it in the frequency setting unit 8.

Lastly, in Step 65, the commutation judging unit 11 switches the first waveform generating unit 6 to the second waveform generating unit 10.

As described above, by providing a frequency correcting unit 50, it becomes possible to produce a difference in the timing of commutation and the operating frequency of the motor, before and after the switching from the first waveform generating unit 6 to the second waveform generating unit 10, thus enabling to control disturbance of the electric current at the time of switching.

Figure 15:
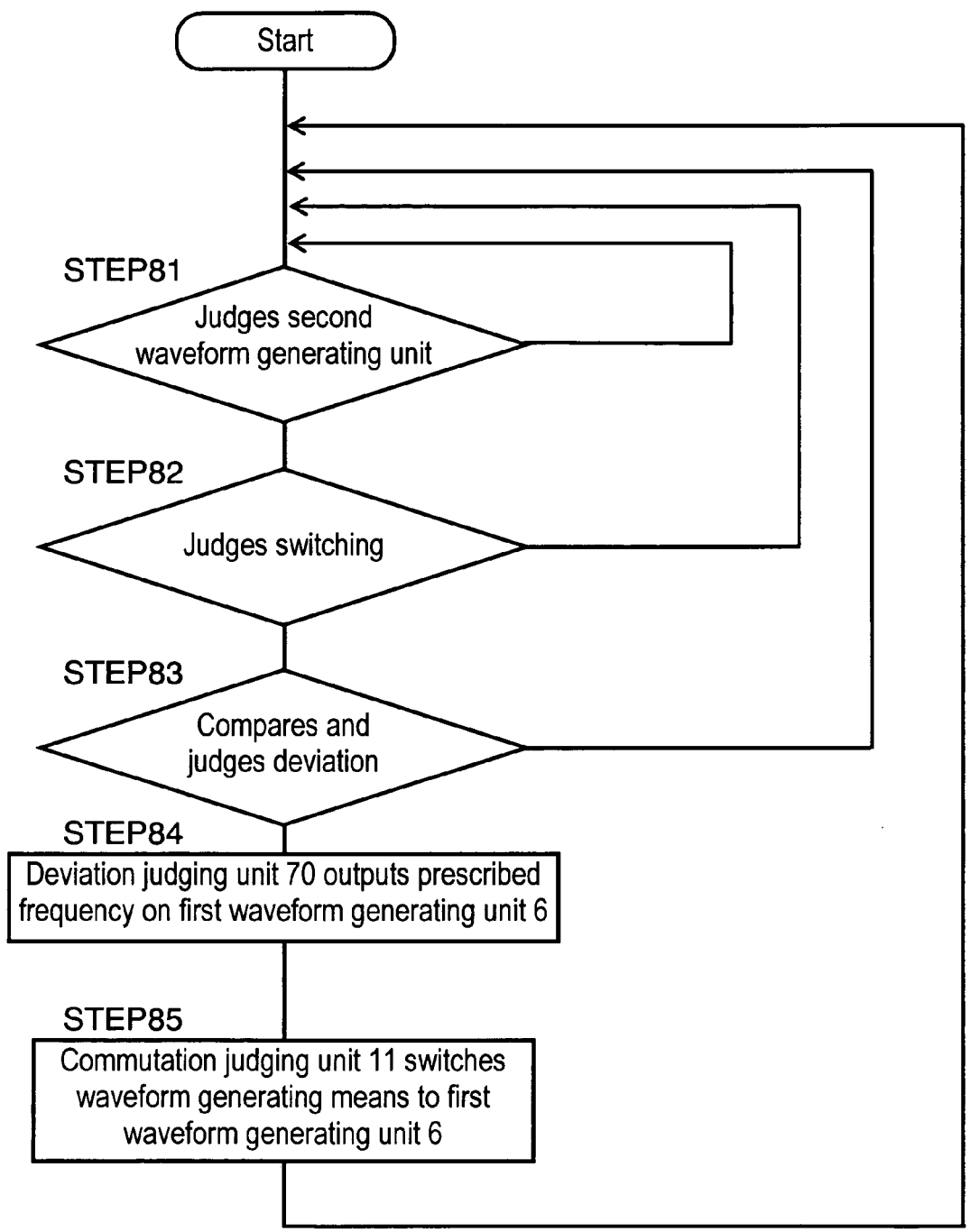
FIG. 15 is a flow chart showing the switching motion from second waveform generating unit to first waveform generating unit, in the fifth preferred embodiment of the present invention.

(2) Next, a case where switching is made from the second waveform generating unit 10 to the first waveform generating unit 6 will be explained, with reference to the block diagram in FIG. 13 and the flow chart in FIG. 15.

Firstly, in Step 81, judgement is made if the second waveform generating unit 10 is selected by the commutation judging unit 11 or not. If the second waveform generating unit 10 is selected, the system proceeds to Step 82.

In Step 82, the commutation judging unit 11 judges necessity or not of switching to the first waveform generating unit 6. If it is judged necessary to do so, the system proceeds to Step 83.

In Step 83, the deviation judging unit 70 judges if the deviation between the frequency detected by the rotating speed detecting unit 7 and the frequency set by the frequency setting unit 8 remains within the range of tolerance or not. If the deviation is within the range of tolerance, the system proceeds to Step 84.

In Step 84, the deviation judging unit 70 instructs the frequency detected by the rotating speed detecting unit 7 as output timing of waveform to the first waveform generating unit 6.

Lastly, in Step 85, the commutation judging unit 11 makes switching the second waveform generating unit 10 to the first waveform generating unit 6.

As described above, by providing a deviation judging unit 70, it becomes possible to produce a difference in the timing of commutation and the operating frequency of the motor, before and after the switching from the second waveform generating unit 10 to the first waveform generating unit 6, thus enabling to control disturbance of the electric current at the time of switching.

SIXTH EMBODIMENT

Figure 16:
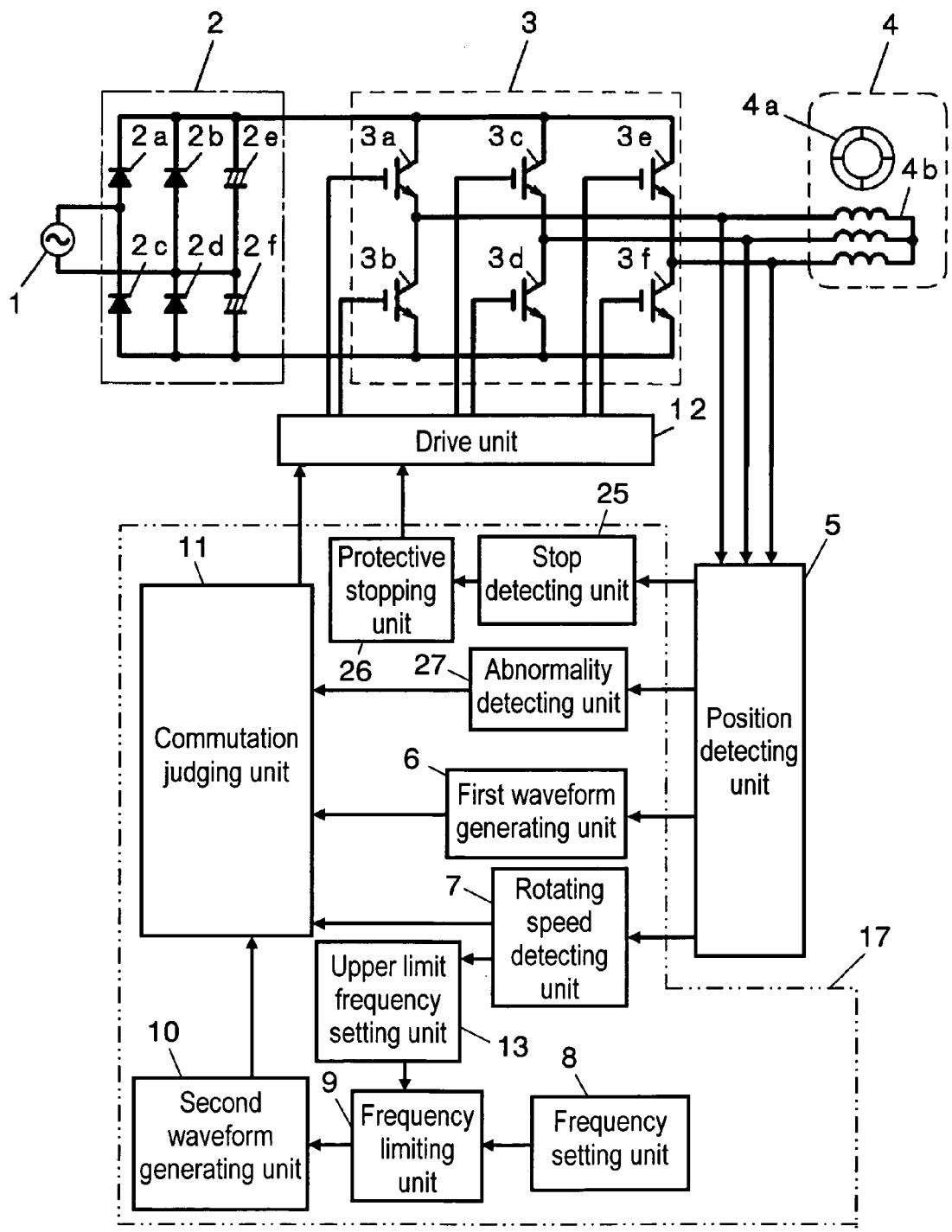
FIG. 16 is a block diagram of the brushless DC motor drive unit in the sixth preferred embodiment of the present invention.

FIG. 16 is a block diagram of the brushless DC motor drive unit in the sixth embodiment of the present invention. In FIG. 16, the portions which were already explained in the preceding embodiments are furnished with the same reference numerals, and any detailed explanation on them will be omitted.

This embodiment provides a brushless DC motor driving apparatus for detecting abnormality in the rotation of brushless DC motor from the position detecting timing of the position detecting unit 5, and taking proper remedial measures.

Figure 17:
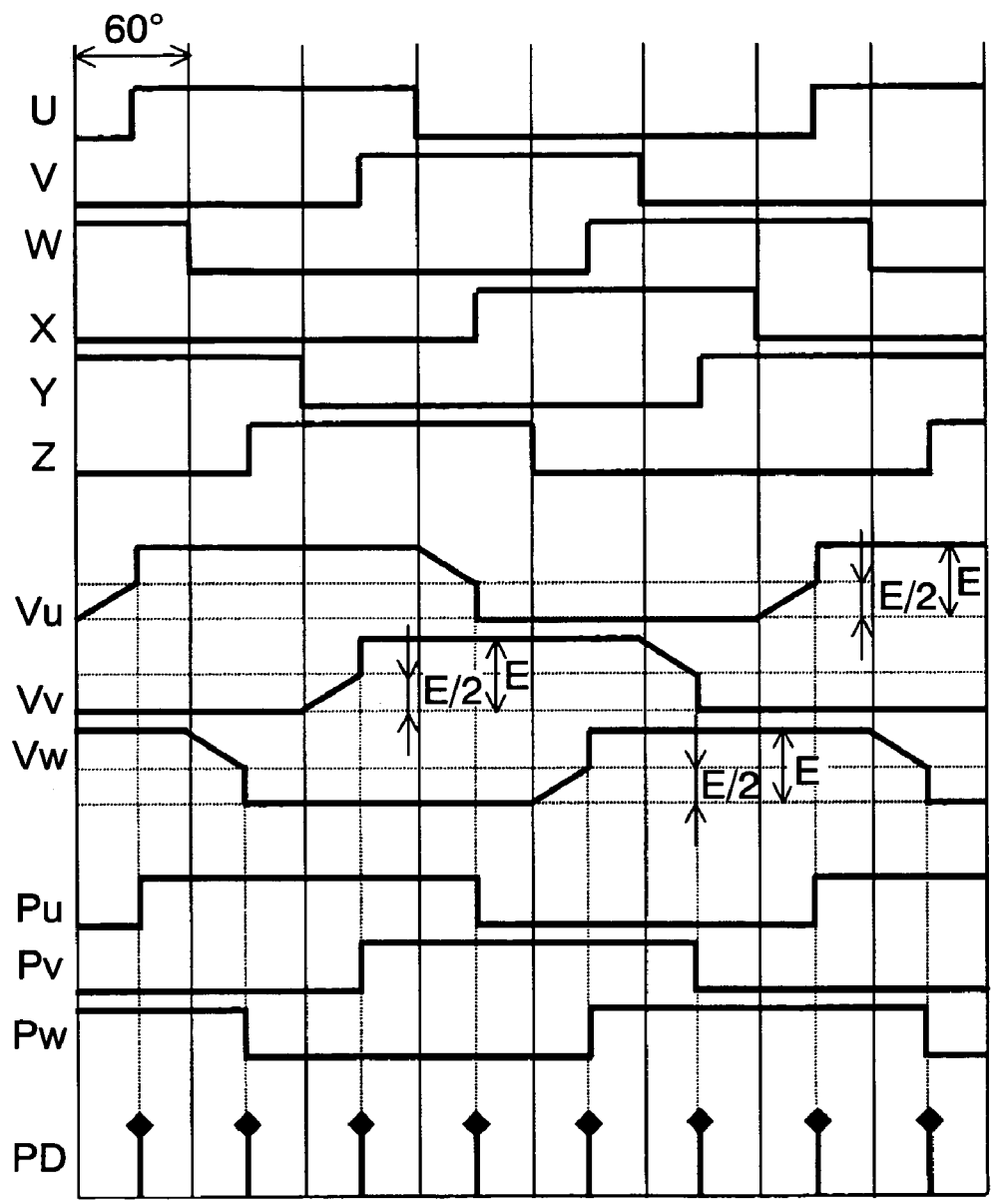
FIG. 17 is the driving waveform by the first waveform generating unit.
Figure 18:
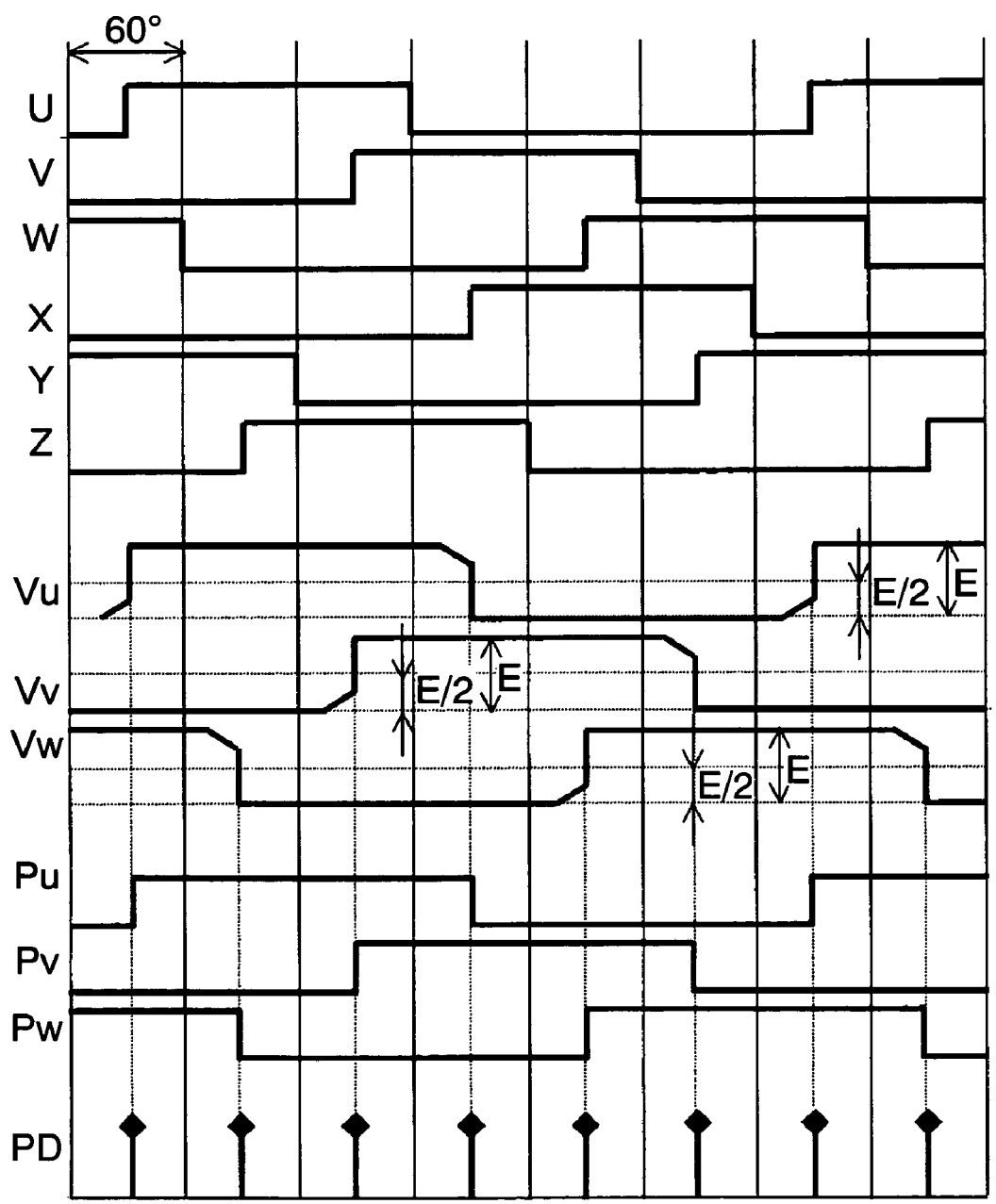
FIG. 18 is the driving waveform by the second waveform generating unit.

FIG. 17 and FIG. 18 indicate the driving waveform by the first waveform generating unit 6 and the second waveform generating unit 10 respectively. U, V, W, X, Y, Z represent the drive signal of the switching elements 3a, 3b, 3c, 3d, 3e, 3f respectively, Vu, Vv, Vw show the output voltage of U, V, W phases of the inverter circuit 3 respectively, and Pu, Pv, Pw are the output signals of the position detecting unit 5 respectively, while PD is the position detecting timing of the position detecting unit 5. In the case where the rotation of the brushless DC motor 4 is normal, the position detecting timing PD nearly coincides with the turning ON of the switching elements.

Figure 19:
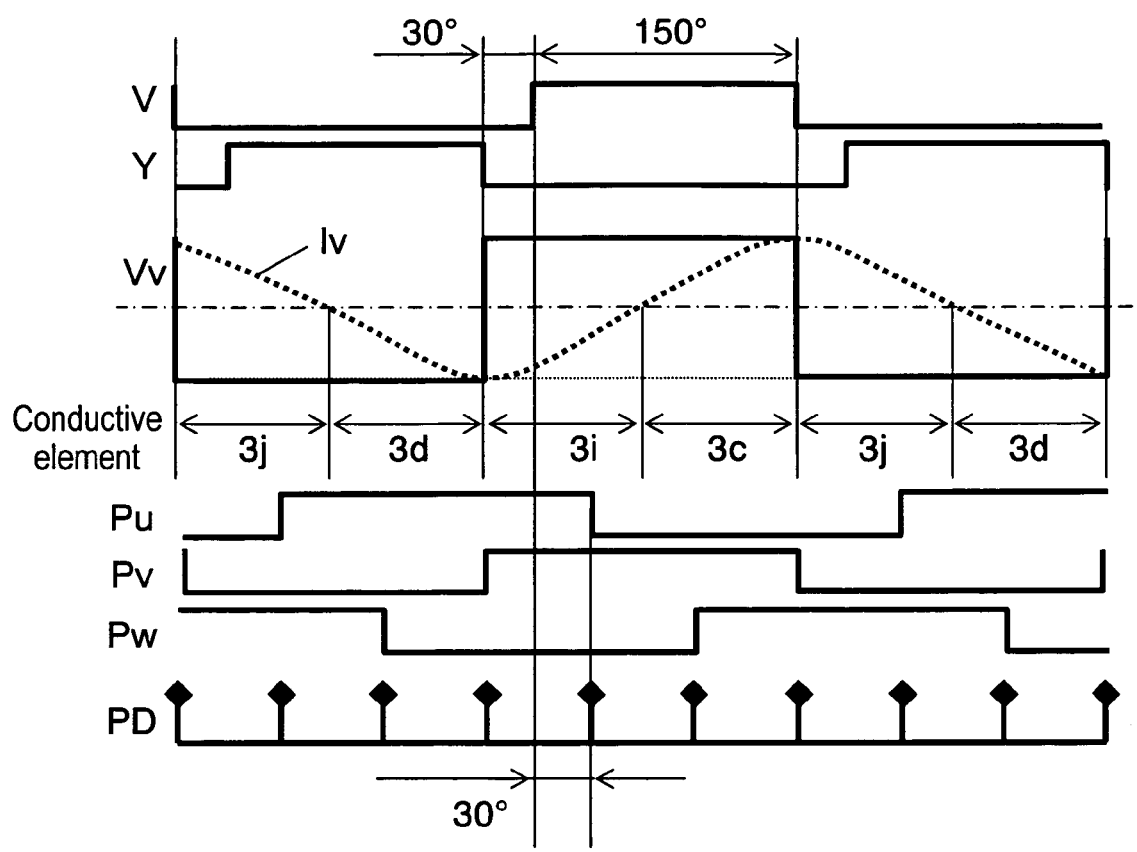
FIG. 19 is the waveform at unusual motor rotation, during driving by the second waveform generating unit.

FIG. 19 is the waveform at unusual stop of the brushless DC motor 4. The position detecting timing PD is produced simultaneously as the OFF timing of the switching elements, i.e. at a position of 30° before and after the ON timing of the switching elements.

As described above, when the brushless DC motor 4 is used as a synchronous motor with the drive signal of the second waveform generating unit 10, there is a difference in the position detecting timing by the position detecting unit 5 between a case of normal rotation and a case where there is something unusual with the rotation. The abnormality detecting unit 27 detects abnormality in the brushless DC motor rotation from the position detecting timing. In the case where the rotation is unusual, the position detecting timing is found in the range of 15° to 45° from the turning ON of the switching elements for example. If the rotation is normal, the position detecting timing is found outside that range.

Unusual motor rotation as mentioned here includes, in addition to a state in which the motor is at stop, a state in which the brushless DC motor is liable to lose synchronism with unstable electric current, because of excessive supply voltage or excessive load applied to the motor.

The driving by the second waveform generating unit 10 is continued in the case of normal rotation. In case anything unusual is detected with the rotation, however, the commutation judging unit 11 returns the driving of the brushless DC motor 4 to driving by the first waveform generating unit 6, and performs commutation according to the signal from the position detecting unit 5. If, at that time, the brushless DC motor is in a state at stop, it will produce states never seen in normal driving such as no input of position detecting signal, high rotating speed synchronizing with the PWM frequency, extremely low PWM duty against the speed, etc. This state is detected by the stop detecting unit 25 as a stop of motor, and the protective stopping unit 26 gives instructions to the drive unit 12, to stop the inverter circuit 3.

Moreover, if the brushless DC motor 4 rotates normally, when the driving by the first waveform generating unit 6 is resumed, the commutation judging unit 11 selects the second waveform generating unit 10 again, and drives the brushless DC motor 4 with synchronous operation by the second waveform generating unit 10. At that time, the upper limit frequency is reset on the upper limit frequency setting unit 13, based on the maximum speed by the driving with the first waveform generating unit 6.

As described above, in case the position detecting timing got into an unusual range, it is possible to correct the speed of switching from driving by the first waveform generating unit 6 to driving by the second waveform generating unit 10, and to reset the upper limit frequency during the driving by the second waveform generating unit 10, by once returning to the driving by the first waveform generating unit 6 and then switch to the driving by the second waveform generating unit 10 again, thus enabling optimal operation suitable to the load.

Furthermore, in case the position detecting timing got into an unusual range, the construction may also be made in such a way as to once stop the inverter 3, and restart it thereafter.

SEVENTH EMBODIMENT

Figure 20:
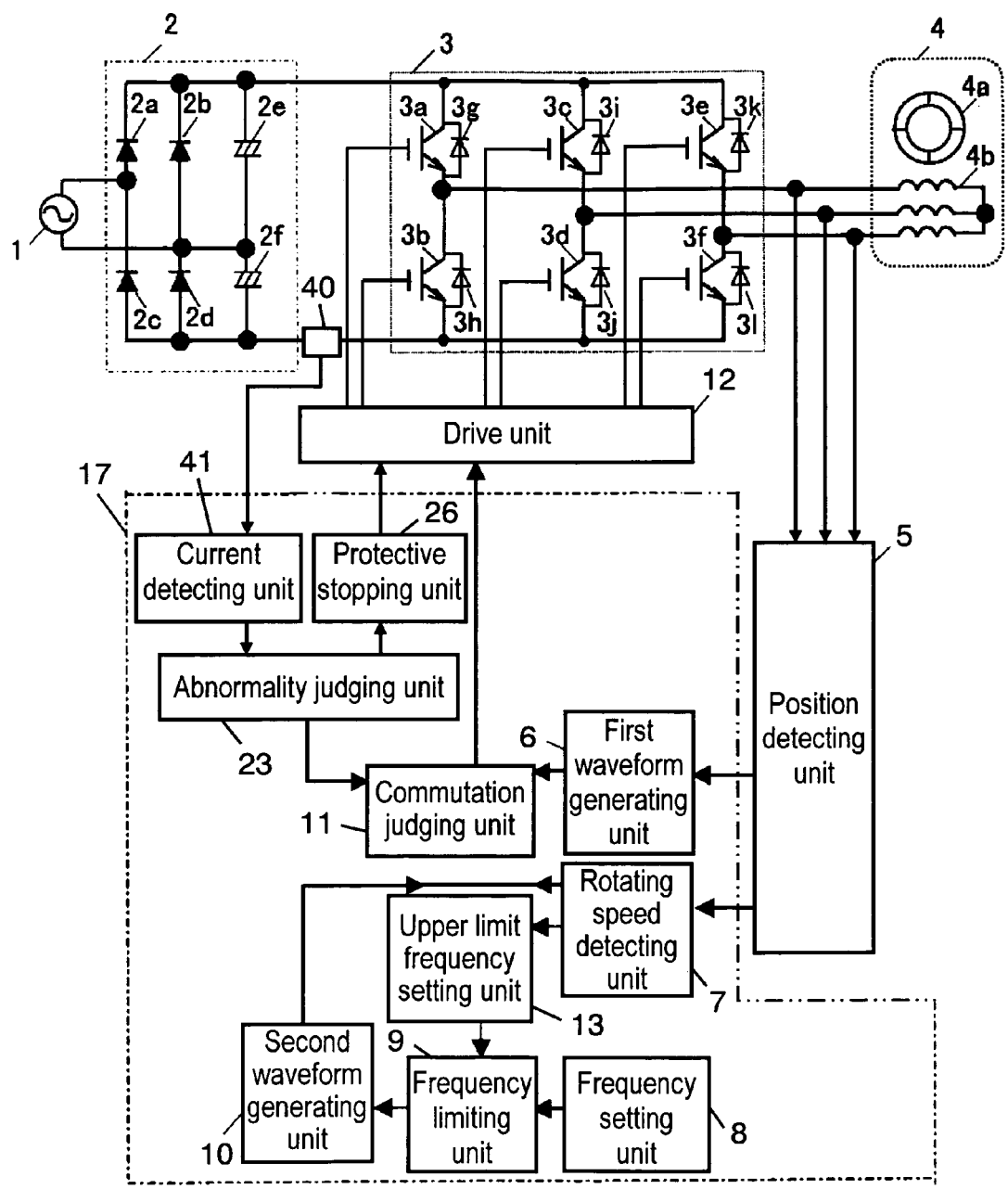
FIG. 20 is a block diagram of the brushless DC motor drive unit in the seventh preferred embodiment of the present invention.

FIG. 20 is a block diagram of the brushless DC motor drive unit of the seventh embodiment of the present invention. In FIG. 20, the portions which were already explained in the preceding embodiments are furnished with the same reference numerals, and any detailed explanation on them will be omitted.

This embodiment provides a brushless DC motor driving apparatus for detecting abnormality in the rotation of brushless DC motor from the electric current flowing through the shunt resistor 40, and taking proper remedial measures.

The current detecting unit 41 detects the electric current flowing through the shunt resistor 40, from the voltage at both ends of the shunt resistor 40.

The abnormality judging unit 23 judges as the brushless DC motor 4 is rotating normally, if the electric current flowing through the shunt resistor 40 is no more than the prescribed value 2A for example, to continue driving with the waveform generating unit (first waveform generating unit 6 or second waveform generating unit 10) currently selected by the commutation judging unit 11.

However, in case the electric current is no smaller than 3A, it is judged that the brushless DC motor 4 is in a state at stop with something unusual such as locking, etc., and a signal for stopping the inverter 3 is sent from the protective stopping unit 26 to the drive unit 12 to stop the brushless DC motor 4.

Moreover, in case the electric current exceeds 2A but remains under 3A, or the electric current is unstable, during driving by the second waveform generating unit 10, it is judged that the brushless DC motor is a state liable to lose synchronism, because of an excessive supply voltage or excessive load, etc. applied to the motor, the driving is once switched to that by the first waveform generating unit 6.

After that, when returning the driving to that by the second waveform generating unit 10 again, it becomes possible to achieve a stable best possible high-speed operation, by determining the upper limit frequency based on the maximum frequency output by the first waveform generating unit 6, at the upper limit frequency setting unit 13, and by further prohibiting output of any frequency higher than the upper limit frequency by means of the frequency limiting unit 9.

Furthermore, if a construction is adopted in which is started either the electric current detecting action by the current detecting unit 41 or the judging action of the abnormality judging unit 23 one minute after the start of the brushless DC motor 4 for example, it becomes possible to prevent any detecting error of detecting some transitory phenomenon at the time of starting as abnormal.

INDUSTRIAL APPLICABILITY

The brushless DC motor drive unit according to the present invention, which is capable of realizing high-efficiency & low-noise operation at low speed, securing stable high-speed operation at high speed and also preventing the peak electric current against the effective electric current with an electric current waveform coming close to sine wave, is suitable to applications for driving especially the compressor of refrigerators and air conditioners.

The invention claimed is:

1. A brushless DC motor driving method comprising:
a brushless DC motor having a stator and a rotor including a permanent magnet,
an inverter for supplying electric power to the brushless DC motor,
a drive unit for driving the inverter,
a position detecting unit for outputting rotor position signal based on a voltage induced on the stator of the brushless DC motor,
a rotating speed detecting unit for detecting a rotating speed of the brushless DC motor from the rotor position signal,
a first waveform generating unit for outputting drive signal based on the rotor position signal, while performing PWM duty control,
a second waveform generating unit for outputting drive signal driving the brushless DC motor as a synchronous motor, while keeping PWM duty constant, and
a commutation judging unit for driving the inverter through the drive unit by selecting one of the drive signal from the first waveform generating unit and the drive signal from the second waveform generating unit,
wherein the method comprises the steps of:
when a rotating speed commanded of the brushless DC motor is smaller than the maximum rotating speed capable of being driven by the drive signal of the first waveform generating unit, driving the inverter by the drive signal outputted from the first waveform generating unit through the drive unit, and
when a rotating speed commanded of the brushless DC motor is larger than the maximum rotating speed capable of being driven by the drive signal of the first waveform generating unit, driving the inverter first by the drive signal outputted from the first waveform generating unit through the drive unit until reaching the maximum rotating speed capable of being driven by the drive signal of the first waveform generating unit, and then
the commutation judging unit changing over from driving by the drive signal of the first waveform generating unit to driving by the drive signal of the second waveform generating unit, and
the second waveform generating unit changing the frequency while keeping the PWM duty constant, and raising the rotating speed of the brushless DC motor to the rotating speed commanded.

2. The brushless DC motor driving method as defined in claim 1, wherein the first waveform generating unit outputs a drive signal of a rectangular wave or a waveform similar to it with an conductive angle no less than 120° but no more than 150°, and the second waveform generating unit outputs a drive signal of a rectangular wave or a waveform similar to it with an conductive angle no less than 130° but no more than 180°.

3. The brushless DC motor driving method as defined in claim 1, wherein the commutation judging unit equalizes, when it switches the selection between the drive signal from the first waveform generating unit and the drive signal from the second waveform generating unit, the output timing of drive signal before and after the switching.

4. The brushless DC motor driving method as defined in claim 1, wherein the commutation judging unit produces, when it switches the selection between the drive signal from the first waveform generating unit and the drive signal from the second waveform generating unit, a difference in the output timing of drive signal before and after the switching.

5. The brushless DC motor driving method as defined in claim 1, wherein the commutation judging unit has a function of preventing, when it switches the selection between the drive signal from the first waveform generating unit and the drive signal from the second waveform generating unit, increase of the electric current flowing through the brushless DC motor.

6. The brushless DC motor driving method as defined in claim 1, wherein the brushless DC motor comprises the rotor having saliency with a construction in which a permanent magnet is embedded in the rotor core.

7. The brushless DC motor driving method as defined in claim 1, wherein the brushless DC motor drives a compressor.

8. A brushless DC motor driving method, comprising:
a brushless DC motor having a stator and a rotor including a permanent magnet,
an inverter for supplying electric power to the brushless DC motor,
a drive unit for driving the inverter,
a position detecting unit for outputting rotor position signal based on a voltage induced on the stator of the brushless DC motor,
a rotating speed detecting unit for detecting a rotating speed of the brushless DC motor from the rotor position signal,
a first waveform generating unit for outputting drive signal based on the rotor position signal, while performing PWM duty control,
a second waveform generating unit for outputting drive signal driving the brushless DC motor as a synchronous motor, while controlling the frequency with the PWM duty kept constant, and
a commutation judging unit for
selecting the drive signal of the first waveform generating unit for driving the inverter by the drive signal outputted from the first waveform generating unit through the drive unit when the rotating speed commanded of the brushless DC motor is smaller than the maximum rotating speed capable of being driven by the drive signal of the first waveform generating unit,
selecting the drive signal of the first waveform generating unit until reaching the maximum rotating speed capable of being driven by the drive signal of the first waveform generating unit when the rotating speed commanded of the brushless DC motor is larger than the maximum rotating speed capable of being driven by the drive signal of the first waveform generating unit, and
changing over from driving by the drive signal of the first waveform generating unit to driving by the drive signal of the second waveform generating unit when reaching the maximum rotating speed capable of being driven by the drive signal of the first waveform generating unit.

9. The brushless DC motor driving method as defined in claim 8, further comprising:
   with a frequency setting unit, setting the frequency of output waveform from the second waveform generating unit, and
   with a frequency limiting unit, limiting the frequency set by the frequency setting unit so that the frequency of output waveform from the second waveform generating unit may not exceed the upper limit frequency.

10. The brushless DC motor driving method as defined in claim 9, comprising:
   with an upper limit frequency setting unit, setting the upper limit frequency based on the maximum frequency of the waveform from the first waveform generating unit.

11. The brushless DC motor driving method as defined in claim 9, wherein the first waveform generating unit outputs a drive signal of a rectangular wave or a waveform similar to it with an conductive angle no less than 120° but no more than 150°, and the second waveform generating unit outputs a drive signal of a rectangular wave or a waveform similar to it with an conductive angle no less than 130° but no more than 180° at a frequency determined by the frequency setting unit.

12. The brushless DC motor driving method as defined in claim 10, further comprising:
   with an upper limit frequency changing unit, resetting the upper limit frequency, after the brushless DC motor is operated for prescribed time with the drive signal output from the second waveform generating unit.

13. The brushless DC motor driving method as defined in claim 9, further comprising:
   with a voltage detecting unit, detecting the output voltage supplied to the inverter, and
   with an upper limit frequency correcting unit, correcting the upper limit frequency based on the voltage value detected by the voltage detecting unit.

14. The brushless DC motor driving method as defined in claim 9, further comprising:
   with a current detecting unit, detecting the output current of the inverter, and
   with a phase difference detecting unit, changing the upper limit frequency based on the phase of the output voltage of the output current detected by the current detecting unit.

15. The brushless DC motor driving method as defined in claim 9, further comprising:
   with a current detecting unit, detecting the output current of the inverter, and
   with an amplitude detecting unit, changing the upper limit frequency based on the amplitude of the output current detected by the current detecting unit.

16. The brushless DC motor driving method as defined in claim 8, further comprising:
   with a frequency setting unit, setting the frequency of the drive signal output by the second waveform generating unit, and
   with a frequency commanding unit, instructing the frequency of the rotating speed detected by the rotating speed detecting unit to the frequency setting unit.

17. The brushless DC motor driving method as defined in claim 8, further comprising:
   with a frequency setting units, setting the frequency of the drive signal output by the second waveform generating unit, and
   with coincidence judging unit, judging if the detecting timing of the rotating speed detecting unit coincides with the output timing of the second waveform generating unit and,
   if coincidence is confirmed, instructing the frequency set by the frequency setting unit as output frequency to the first waveform generating unit.

18. The brushless DC motor driving method as defined in claim 8, comprising:
   with a frequency correcting unit, correcting the frequency of rotating speed detected by the rotating speed detecting unit, and instructing it as output frequency to the frequency setting unit.

19. The brushless DC motor driving method as defined in claim 8, comprising:
   with a deviation judging unit, judging if the detecting timing of the position detecting circuit remains within the range of tolerance or not against the output timing of the second waveform generating unit and instructing the frequency set by the frequency setting unit as output frequency to the first waveform generating unit.

20. The brushless DC motor driving method as defined in claim 8, further comprising:
   with a stop detecting unit, detecting if the brushless DC motor is at stop with abnormality or not based on the output signal from the position detecting unit, and
   with a protective stopping unit, stopping the driving of the inverter by the drive unit in case the stop detecting unit detected some unusual stop.

21. The brushless DC motor driving method as defined in claim 20, wherein the motor is restarted after the protective stopping unit stopped the driving of the inverter by the drive unit.

22. The brushless DC motor driving method as defined in claim 8, further comprising:
   with an abnormality detecting unit, detecting abnormality in the rotation of the brushless DC motor based on the position detecting timing of the position detecting unit.

23. The brushless DC motor driving method as defined in claim 22, wherein the abnormality detecting unit detects presence of abnormality in the rotation of the brushless DC motor, in case the position detecting timing of the position detecting unit got out of the prescribed range before and after the "ON" timing of the switching elements of the inverter.

24. The brushless DC motor driving method as defined in claim 22, wherein the commutation judging unit switches, while driving the inverter with the second waveform generating unit, the driving with the second waveform generating unit to driving with the first waveform generating unit, in case the abnormality detecting unit detected some abnormality in the rotation of the brushless DC motor.

25. The brushless DC motor driving method as defined in claim 24, wherein the commutation judging unit switches, after switching the driving with the second waveform generating unit to driving with the first waveform generating unit, following detection of abnormality in the driving of the brushless DC motor by the abnormality detecting unit, if nothing unusual is detected with the rotation of the brushless DC motor.

26. The brushless DC motor driving method as defined in claim 8, further comprising:
   with a current detecting unit, detecting the output current of the inverter, with an abnormality judging unit, judging the state of motor rotation based on the current detected by the current detecting unit, and with a protective stopping unit, stopping the driving of the inverter by the drive unit in case the abnormality judging unit judged presence of abnormality.

27. The brushless DC motor driving method as defined in claim 8, further comprising driving a brushless DC motor comprising a rotor having saliency with a construction in which a permanent magnet is embedded in the rotor core.

28. The brushless DC motor driving method as defined in claim 8, further comprising driving a compressor with the brushless DC motor.

* * * * *

UNITED STATES PATENT AND TRADEMARK OFFICE
CERTIFICATE OF CORRECTION

| | | |
|---|---|---|
| PATENT NO. | : 7,102,306 B2 | Page 1 of 1 |
| APPLICATION NO. | : 10/546001 | |
| DATED | : September 5, 2006 | |
| INVENTOR(S) | : Hamaoka et al. | |

It is certified that error appears in the above-identified patent and that said Letters Patent is hereby corrected as shown below:

In column 16, line 1 of the Letters Patent, in claim 17 (Amendment claim 17), "with coincidence" should read --with a coincidence--.

Signed and Sealed this

Seventeenth Day of April, 2007

JON W. DUDAS
*Director of the United States Patent and Trademark Office*